(12) United States Patent　(10) Patent No.: US 8,045,692 B2
Schultz　(45) Date of Patent: Oct. 25, 2011

(54) SYSTEM AND METHOD FOR DETERMINING WHETHER TO REQUEST ADDITIONAL TELEPHONE NUMBERING RESOURCES BY A TELECOMMUNICATIONS CARRIER

(75) Inventor: Justin F. Schultz, Mansfield, OH (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1130 days.

(21) Appl. No.: 11/606,655

(22) Filed: Nov. 29, 2006

(65) Prior Publication Data

US 2008/0043948 A1　Feb. 21, 2008

Related U.S. Application Data

(63) Continuation-in-part of application No. 11/507,142, filed on Aug. 21, 2006.

(51) Int. Cl.
*H04M 3/00* (2006.01)
*H04M 7/00* (2006.01)
*H04M 15/00* (2006.01)
*H04M 3/42* (2006.01)

(52) U.S. Cl. ............... 379/219; 379/112.06; 379/201.01; 379/221.14; 379/242

(58) Field of Classification Search ............. 379/112.06, 379/112.07, 201.01–201.03, 201.12, 219, 379/220.01, 221.06, 221.13, 221.14, 242
See application file for complete search history.

(56) References Cited

U.S. PATENT DOCUMENTS

2002/0136391 A1* 9/2002 Armstrong ................... 379/242
2004/0190708 A1* 9/2004 Cuckson et al. .......... 379/221.13
* cited by examiner

*Primary Examiner* — Harry Hong
(74) *Attorney, Agent, or Firm* — SNR Denton US LLP

(57) ABSTRACT

A system for determining whether to request additional telephone number resources for a telecommunications carrier. The system may include a first database operated by a telecommunications carrier and configured to store data indicative of telephone number usage of telephone numbers assigned to the telecommunications carrier. A computing device may be in communication with a second database via a network, the second database may contain telephone number usage information associated with multiple telecommunications carriers. The computing device may execute software to query the first and second databases to retrieve information associated with the telecommunications carrier (i) to determine current utilization of telephone numbers of a rate center and (ii) to determine months to exhaust of telephone numbers.

20 Claims, 17 Drawing Sheets

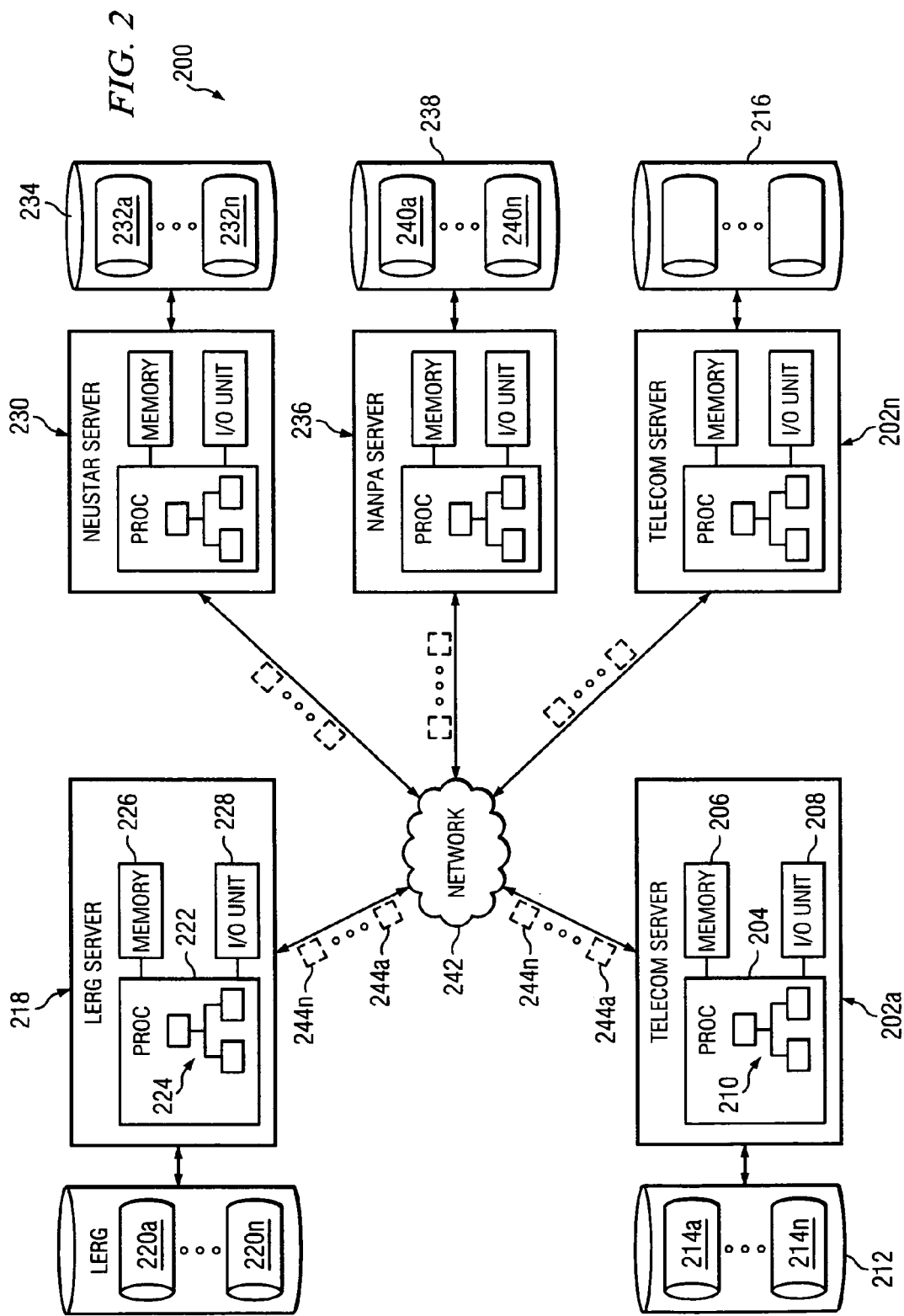

FIG. 3A-1

North American Numbering Plan
Numbering Resource Utilization/Forecast Report
Form U1 - UTILIZATION REPORTING FORM (FOR NON-RURAL PRIMARY CARRIERS)

>>> Please See The Instructions Before Completing This Form <<<

☐ Check this box if the data on this form replaces the data on a previously submitted form.

[Go To The Main Menu]    [Check the Data Before Submitting]

| Parent Company Name | Sprint |
| --- | --- |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

| Parent Company OCN(s) | NONE |
| --- | --- |
| Service Provider OCN | 2084 |
| Service Provider FRN | 0005051768 |
| SP Service Type | Incumbent Local Exchange Carrier (ILEC) |

All Changes to Parent Company Name, Service Provider Name, Address, Contact Information, OCN(s), FRN and Service Type must be made on the Company Info page.

TO FIG. 3A-2

FROM FIG. 3A-1

Numbering Resource Utilization For Each 1K Block

| NPA-NXX | X | Rate Center Abbreviation | 312a → Assigned | 312b → Intermediate | 312c → Reserved | 312d → Aging | 312e → Admin | Donated to Pool? | Notes/Assignee | Available | Utilization | Errors/Messages |
|---|---|---|---|---|---|---|---|---|---|---|---|---|
| 903-489 | 2 | MALAKOFF | 907 | 0 | 1 | 35 | 4 | | | 53 | 90.70% | |
| 903-489 | 3 | MALAKOFF | 656 | 0 | 5 | 83 | 0 | | | 256 | 65.50% | |
| 903-489 | 4 | MALAKOFF | 88 | 0 | 4 | 39 | 1 | | | 868 | 8.80% | |
| 903-489 | 5 | MALAKOFF | 0 | 0 | 0 | 0 | 0 | | | 1000 | DONATED | |
| 903-489 | 6 | MALAKOFF | 0 | 0 | 0 | 0 | 0 | X | | 1000 | DONATED | |
| 903-489 | 7 | MALAKOFF | 0 | 0 | 0 | 0 | 0 | X | | 1000 | DONATED | |
| 903-489 | 8 | MALAKOFF | 0 | 0 | 0 | 0 | 0 | X | | 1000 | DONATED | |
| 903-489 | 9 | MALAKOFF | 105 | 0 | 0 | 68 | 0 | | | 827 | 10.50% | |
| 903-498 | 0 | KEMP | 98 | 0 | 0 | 2 | 1 | | | 900 | 9.80% | |
| 903-498 | 1 | KEMP | 241 | 0 | 0 | 23 | 1 | | | 735 | 24.10% | |
| 903-498 | 2 | KEMP | 258 | 0 | 0 | 82 | 2 | | | 659 | 25.80% | |
| 903-498 | 3 | KEMP | 587 | 0 | 0 | 134 | 1 | | | 277 | 58.70% | |
| 903-498 | 4 | KEMP | 883 | 0 | 0 | 34 | 1 | | | 82 | 88.30% | |
| 903-498 | 5 | KEMP | 355 | 0 | 0 | 167 | 0 | | | 478 | 35.50% | |

North American Numbering Plan
Numbering Resource Utilization/Forecast Report
Form F-1b - FORECAST REPORTING FORM (FOR POOLING CARRIERS)
(GROWTH THOUSAND BLOCKS)

>>> Please See The Instructions Before Completing This Form <<<

☐ Check this box if the data on this form replaces the data on a previously submitted form.

| Go To The Main Menu | | Go To Initial Forecast Form F-1a | |
|---|---|---|---|

314 ↙

| | | | | |
|---|---|---|---|---|
| Parent Company Name | Sprint | | Parent Company OCN(s) | NONE |
| Service Provider Name | SPRINT/UNITED TELEPHONE CO. OF TE | | Service Provider OCN | 2084 |
| Company Address | 665 Lexington Ave | | Service Provider FRN | 0005051768 |
| Address 2 | <Address 2> | | SP Service Type | Incumbant Local Exchange Carrier (ILEC) |
| City | Mansfield | | | |
| State | OH | | All Changes to Parent Company Name, Service Provider Name, Address, Contact Information, OCN(s), FRN and Service Type must be made on the Company Info page. | |
| Zip | 44907 | | | |
| Contact name | Cory Hames | | | |
| Contact Tel # | 419-755-8746 | | | |
| Fax #: | 419-756-5016 | | | |
| E-mail | cory.l.hames@mail.sprint.com | | | |

316 ↗ Check the Data Before Submitting

| NPA | Rate Center Abbreviation | State Abbreviation | Pooling Area Forecast In 1K Blocks Per Rate Center, Per Year (Growth 1K Blocks) | | | | | Total 1K Blocks | Errors/Messages |
|---|---|---|---|---|---|---|---|---|---|
| | | | Year 1 | Year 2 | Year 3 | Year 4 | Year 5 | | |
| 254 | GATESVILLE | TX | 0 | 0 | 0 | 0 | 0 | 0 | |
| 254 | STEPHENVL | TX | 0 | 0 | 0 | 0 | 0 | 0 | |
| 903 | ARP | TX | 0 | 0 | 0 | 0 | 0 | 0 | |
| 903 | CAYUGA | TX | 0 | 0 | 0 | 0 | 0 | 0 | |
| 903 | COMMERCE | TX | 0 | 0 | 0 | 0 | 0 | 0 | |
| 903 | COOPER | TX | 0 | 0 | 0 | 0 | 0 | 0 | |
| 903 | EUSTACE | TX | 0 | 0 | 0 | 0 | 0 | 0 | |
| 903 | KERENS | TX | 0 | 0 | 0 | 0 | 0 | 0 | |
| 903 | MABANK | TX | 0 | 0 | 0 | 0 | 0 | 0 | |
| 903 | MALAKOFF | TX | 0 | 0 | 0 | 0 | 0 | 0 | |
| 903 | MURCHISON | TX | 0 | 0 | 0 | 0 | 0 | 0 | |
| 903 | PALESTINE | TX | 0 | 0 | 0 | 0 | 0 | 0 | |
| 903 | PAYNE SPG | TX | 0 | 0 | 0 | 0 | 0 | 0 | |

FROM FIG. 3B-1

North American Numbering Plan
Numbering Resource Utilization/Forecast Report
Form F-2b - FORECAST REPORTING FORM (FOR NON-POOLING CARRIERS IN POOLING AREAS)
(GROWTH CODES)

>>> Please See The Instructions Before Completing This Form <<<

☐ Check this box if the data on this form replaces the data on a previously submitted form.

| [Go To The Main Menu] | [Go To Initial Forecast Form F-2a] | [Check the Data Before Submitting] |

320 ↙

| | |
|---|---|
| Parent Company Name | Sprint |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

322 ↙

| | |
|---|---|
| Parent Company OCN(s) | NONE |
| Service Provider OCN | 2084 |
| Service Provider FRN | 0005051768 |
| SP Service Type | Incumbent Local Exchange Carrier (ILEC) |

All Changes to Parent Company Name, Service Provider Name, Address, Contact Information, OCN(s), FRN and Service Type must be made on the Company Info page.

TO FIG. 3C-2

FROM FIG. 3C-1

324

| | | | Forecast Reported in NXX(s) Per Rate Center, Per Year (Growth Codes) | | | | | | |
|---|---|---|---|---|---|---|---|---|---|
| NPA | Rate Center Abbreviation | State Abbreviation | Year 1 | Year 2 | Year 3 | Year 4 | Year 5 | Total NXX(s) | ERRORS/MESSAGES |
| 254 | BREMOND | TX | 0 | 0 | 0 | 0 | 0 | 0 | |
| 254 | DUBLIN | TX | 0 | 0 | 0 | 0 | 0 | 0 | |
| 254 | FLAT | TX | 0 | 0 | 0 | 0 | 0 | 0 | |
| 254 | GROESBECK | TX | 0 | 0 | 0 | 0 | 0 | 0 | |
| 254 | HAMILTON | TX | 0 | 0 | 0 | 0 | 0 | 0 | |
| 254 | HICO | TX | 0 | 0 | 0 | 0 | 0 | 0 | |
| 254 | JONESBORO | TX | 0 | 0 | 0 | 0 | 0 | 0 | |
| 254 | KOSSE | TX | 0 | 0 | 0 | 0 | 0 | 0 | |
| 254 | POTTSVILLE | TX | 0 | 0 | 0 | 0 | 0 | 0 | |
| 254 | THORNTON | TX | 0 | 0 | 0 | 0 | 0 | 0 | |
| 903 | ATHENS | TX | 0 | 0 | 0 | 0 | 0 | 0 | |
| 903 | BROWNSBORO | TX | 0 | 0 | 0 | 0 | 0 | 0 | |
| 903 | BULLARD | TX | 0 | 0 | 0 | 0 | 0 | 0 | |

North American Numbering Plan
Numbering Resource Utilization/Forecast Report
Form F-3b - FORECAST REPORTING FORM (FOR CARRIERS IN NON-POOLING AREAS)
(GROWTH CODES)

>>> Please See The Instructions Before Completing This Form <<<

☐ Check this box if the data on this form replaces the data on a previously submitted form.

| Go To The Main Menu | | Go To Initial Forecast Form F-3a | | Check the Data Before Submitting |

326

| Parent Company Name | Sprint |
| Service Provider Name | SPRINT/UNITED TELEPHONE CO. OF TE |
| Company Address | 665 Lexington Ave |
| Address 2 | <Address 2> |
| City | Mansfield |
| State | OH |
| Zip | 44907 |
| Contact name | Cory Hames |
| Contact Tel # | 419-755-8746 |
| Fax #: | 419-756-5016 |
| E-mail | cory.l.hames@mail.sprint.com |

328

| Parent Company OCN(s) | NONE |
| Service Provider OCN | 2084 |
| Service Provider FRN | 0005051768 |
| SP Service Type | Incumbant Local Exchange Carrier (ILEC) |

All Changes to Parent Company Name, Service Provider Name, Address, Contact Information, OCN(s), FRN and Service Type must be made on the Company Info page.

330

| Forecast Reported in NXX(s) Per NPA, Per Year (Growth Codes) | | | | | | | |
|---|---|---|---|---|---|---|---|
| NPA | State Abbreviation | Year 1 | Year 2 | Year 3 | Year 4 | Year 5 | Total NXX(s) | Errors/Messages |
| <NPA> | <St> | 0 | 0 | 0 | 0 | 0 | 0 | |

Months To Exhaust

Months to Exhaust and Utilization Form

Choose State and Rate Center
- ST: TX (702)
- RTCTR: DECATUR (704)

Date: 4/6/2006

| OCN | Company Name |
|---|---|
| 2114 | CENTRAL TELEPHONE CO. - TEXAS |

Rate Center NPA-NXX's (708)

| ST | RTCTR | NPA | NXX |
|---|---|---|---|
| TX | DECATUR | 940 | 393 |
| TX | DECATUR | 940 | 626 |
| TX | DECATUR | 940 | 627 |

Numbering Resources

| Available Numbers | Assigned Numbers | Total Numbering Resources | Months to Exhaust | % Utilization |
|---|---|---|---|---|
| 5551 | 17449 | 23000 | 43.62 | 75.87% |

Customer Requested Numbers (712): 0 (714)

Growth History (716)

| M-12 | M-11 | M-10 | M-9 | M-8 | M-7 | M-6 | M-5 | M-4 | M-3 | M-2 | M-1 |
|---|---|---|---|---|---|---|---|---|---|---|---|
| -7 | -25 | 782 | 543 | 6 | -768 | -8 | -70 | -20 | -40 | 1100 | 34 |

Forecast (718)

| M-1 | M-2 | M-3 | M-4 | M-5 | M-6 | M-7 | M-8 | M-9 | M-10 | M-11 | M-12 |
|---|---|---|---|---|---|---|---|---|---|---|---|
| 128 | 128 | 128 | 128 | 128 | 128 | 128 | 128 | 128 | 128 | 128 | 128 |

Thous. Block Utilization (710)

| NPA | NXX | Thous. | % Utilization |
|---|---|---|---|
| 940 | 626 | 0 | 99.4% |
| 940 | 626 | 1 | 73.3% |
| 940 | 626 | 2 | 32.2% |
| 940 | 626 | 3 | 19.6% |
| 940 | 626 | 4 | 95.7% |
| 940 | 626 | 5 | 100.0% |
| 940 | 626 | 6 | 100.0% |
| 940 | 626 | 7 | 100.0% |
| 940 | 626 | 8 | 24.3% |

[Back to Switchboard]

*FIG. 7A*

Months To Exhaust

Months to Exhaust and Utilization Form

Choose State and Rate Center
- ST: TX — 702
- RTCTR: DECATUR — 704

4/6/2006 — 706

| OCN | Company Name |
|---|---|
| 2114 | CENTRAL TELEPHONE CO. - TEXAS |

Numbering Resources

| Available Numbers | Assigned Numbers | Total Numbering Resources | Months to Exhaust | % Utilization |
|---|---|---|---|---|
| 5551 | 17449 | 23000 | 5.78 | 75.87% |

Customer Requested Numbers: 5000 — 714

712

Rate Center NPA-NXX's — 708

| ST | RTCTR | NPA | NXX |
|---|---|---|---|
| TX | DECATUR | 940 | 393 |
| TX | DECATUR | 940 | 626 |
| TX | DECATUR | 940 | 627 |

Thous. Block Utilization — 710

| NPA | NXX | Thous. | % Utilization |
|---|---|---|---|
| 940 | 626 | 0 | 99.4% |
| 940 | 626 | 1 | 73.3% |
| 940 | 626 | 2 | 32.2% |
| 940 | 626 | 3 | 19.6% |
| 940 | 626 | 4 | 95.7% |
| 940 | 626 | 5 | 100.0% |
| 940 | 626 | 6 | 100.0% |
| 940 | 626 | 7 | 100.0% |
| 940 | 626 | 8 | 24.3% |

Growth History — 716

| M-12 | M-11 | M-10 | M-9 | M-8 | M-7 | M-6 | M-5 | M-4 | M-3 | M-2 | M-1 |
|---|---|---|---|---|---|---|---|---|---|---|---|
| -7 | -25 | 782 | 543 | 6 | -768 | -8 | -70 | -20 | -40 | 1100 | 34 |

Forecast — 718

| M-1 | M-2 | M-3 | M-4 | M-5 | M-6 | M-7 | M-8 | M-9 | M-10 | M-11 | M-12 |
|---|---|---|---|---|---|---|---|---|---|---|---|
| 128 | 128 | 128 | 128 | 128 | 128 | 128 | 128 | 128 | 128 | 128 | 128 |

[Back to Switchboard]

MONTHS TO EXHAUST and UTILIZATION CERTIFICATION WORKSHEET - TN Level[1]
(Thousands-Block Number Pooling Growth Block Request)

Date: 04/06/06　　OCN: 2114　　Company Name: CENTRAL TEL. CO. OF TEXAS
Rate Center: Decatur
List all Codes NPA(s)-NXXs and Blocks NPA(s)-NXX-X(s): 940-393-0, 4, 7, 8, 940-626-0, 1, 2, 3, 4, 5, 6, 7, 8, 940-627
Name of Block Applicant: John Smith　　Signature:
Title: Sr. Engineer Switch Administration　　Telephone No.: 123-456-7890　　FAX No.: 123-456-1234
E-Mail: John.Smith@embarq.com A. Available Numbers: 5,551

B. Assigned Numbers: 17,449

C. Total Numbering Resources: 23,000

D. Quantity of numbers activated in the past 90 days and excluded from the Utilization calculation: 0
   List excluded Code(s) or Block(s):

| | Month #1 | Month #2 | Month #3 | Month #4 | Month #5 | Month #6 | Month #7 | Month #8 | Month #9 | Month #10 | Month #11 | Month #12 |
|---|---|---|---|---|---|---|---|---|---|---|---|---|
| E. Growth History - Previous 6 months[2] | -8 | -70 | -20 | -40 | 11100 | 34 | | | | | | |
| F. Forecast - Next 12 months[3] | 3128 | 128 | 128 | 128 | 128 | 128 | 128 | 128 | 128 | 128 | 128 | 128 |

G. Average Monthly Forecast (Sum of months #1-6 (Part F above) divided by 6): 628

H. Months to Exhaust[4]　　$\dfrac{\text{Numbers Available for Assignment to Customers (A)}}{\text{Average Monthly Forecast (G)}}$ = 　　= 5.78

I. Utilization[5]　　$\dfrac{\text{Assigned Numbers (B) - Excluded Numbers (D)}}{\text{Total Numbering Resources (C) - Excluded Numbers (D)}}$ × 100 = 75.87%

Explanation:

---

1　A copy of this worksheet is required to be submitted to the Pooling Administrator when requesting additional numbering resources in a rate center. For auditing purposes, the applicant must retain a copy of this document.
2　Net change in TNs no longer available for assignment in each previous month, starting with the most distant month as Month #1, and Month #6 as the current month.
3　Forecast of TNs needed in each following month, starting with most recent month as Month #1.
4　To be assigned an additional thousands-block (NXX-X) for growth, "Months to Exhaust" must be less than or equal to 6 months. (FCC 00-104₆S 52.15 (g) (3) (III)).
5　Newly acquired numbers may be excluded from the Utilization calculation (FCC 00104, section 52.15 (g)(3)(II))

FIG. 10

SYSTEM AND METHOD FOR DETERMINING WHETHER TO REQUEST ADDITIONAL TELEPHONE NUMBERING RESOURCES BY A TELECOMMUNICATIONS CARRIER

CROSS-REFERENCE TO RELATED APPLICATION

This Application for Patent is a Continuation-in-Part and claims the benefit of priority from co-pending U.S. patent application Ser. No. 11/507,142 filed Aug. 21, 2006 and titled "System and Method for Reporting Telecommunications Utilization and Forecasting." The entire teachings of the above application is incorporated herein by reference.

BACKGROUND

The ten-digit North American Numbering Plan (NANP) currently used by the United States and 19 other countries is rapidly being depleted. Management of this resource is impaired by a lack of uniform data. Under the Communications Act of 1934, as amended by the Telecommunications Act of 1996, the Federal Communications Commission (FCC) was given "exclusive jurisdiction over those portions of the North American Numbering Plan that pertain to the United States." Pursuant to that authority, the FCC conducted a rulemaking that, among other things, addressed regular reporting on numbering resources used by United States telecommunications carriers.

The FCC appointed an agency, known as the North American Numbering Plan Administrator (NANPA), to monitor numbering resources utilized by all telecommunications carriers using the resources and to project the dates of area code and North American Numbering Plan exhaust. In their duties, NANPA created a numbering utilization report that telecommunications carriers are to submit semi-annually. The report is known as the Numbering Resource Utilization/Forecast (NRUF) Report.

The NRUF Report includes a number of different forms that provide NANPA with information as to the usage of telecommunications allotted phone numbers. As understood in the telecommunications industry, each telecommunications carrier is allotted a certain number of phone numbers in blocks of 10,000, which is generally subdivided into ten blocks of a thousand. Ten-digit phone numbers include a (i) numbering plan area (NPA) (i.e., area code), which is three digits, (ii) central office code (NXX), which is also three digits, and (iii) thousands digit block (i.e., the first digit of the last four digits of a phone number). Telecommunications carriers provide phone numbers to customers from these blocks of a thousand numbers. As a thousands block is filled, it is considered to be exhausted. Some thousands digit blocks become filled while others become empty depending on how the telecommunications carrier customer base changes. The telecommunications carrier reports the existing usage and forecasts future usage of the phone numbers in the NRUF Report.

One problem that exists with the NRUF Report is the time necessary to collect and process the information to report. Telecommunications carriers generally have many divisions, many central offices, thousands of thousands blocks, and millions of customers. Managing this information and reporting it can take several man-weeks for producing each NRUF Report.

Another problem that exists is that there is no standard method for forecasting exhaustion of a thousands block. Telecommunications carriers or service providers (SP) throughout the telecommunications industry currently submit requests for additional numbering resources to a pooling administrator, currently NeuStar, by completing a Months to Exhaust and Utilization Certification Worksheet. Calculations for reported values on the form are performed manually and then typed onto the form. The Months to Exhaust (MTE) form maybe prepared using a web-based graphical user interface (GUI) provided by the Pooling Administration System (PAS) (*PAS User Guide for SPs*, 5.1 *Request for Pool Resources: Task Overview*, Apr. 17, 2006, NeuStar, Inc.).

Regardless of whether or not a service provider requests additional telephone number resources on a paper worksheet, a software worksheet, or the website, the same information is required. For large rate centers, the process of compiling a carrier's current numbering resources and performing hand calculations on available and assigned numbers is one that can take several days and even weeks to complete. Many times a company may feel the need to request an additional block of numbers, but not know whether the request will be granted without performing all calculations required to complete the form. The end result is often determined that the required conditions are not met and the effort to complete the forms has gone to waste. Given the amount of time needed to determine the current and projected resources needed, service providers are often reluctant to embark on the effort to make the determination if there is a chance that the outcome of the request will be denied.

SUMMARY

To overcome the problems that exist for telecommunications carriers having to spend much time and resources to determine current and projected telephone number resources, the principles of the present invention provide for a system and method for performing the determination of current and projected telephone number resources in a few minutes. By being able to determine the resources in such an expedited manner, a telecommunications carrier may minimize cost and resources for filling out the Months to Exhaust and Utilization Certification Worksheet. In addition, the telecommunications carrier substantially reduces the risk of exhausting its telephone number resources due to being able to make the resource determination in such an expeditious manner.

One embodiment for accomplishing the resource determination includes a system for determining whether to request additional telephone number resources for a telecommunications carrier. The system may include a first database operated by a telecommunications carrier and configured to store data indicative of telephone number usage of telephone numbers assigned to the telecommunications carrier. A computing device may be in communication with a second database via a network, where the second database may contain telephone number usage information associated with multiple telecommunications carriers. The computing device may execute software to query the first and second databases to retrieve information associated with the telecommunications carrier (i) to determine current utilization of telephone numbers of a rate center and (ii) to determine months to exhaust of telephone numbers.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 2 is a block diagram of a system configuration for fulfilling governmental telecommunications telephone number usage reporting requirements;

FIGS. 3A-1-3A-2, 3B-1-3B-2, 3C-1-3C-2, 3D (hereinafter FIGS. 3A-3D) are exemplary completed NRUF forms;

FIGS. 7A and 7B are graphical user interfaces of exemplary Months to Exhaust and Utilization Forms with data representative of the two examples;

FIG. 10 is an exemplary Months to Exhaust and Utilization Certification Worksheet that may be used by a telecommunications carrier for requesting additional resources from the pooling administrator.

DETAILED DESCRIPTION OF DRAWINGS

Figure 1:
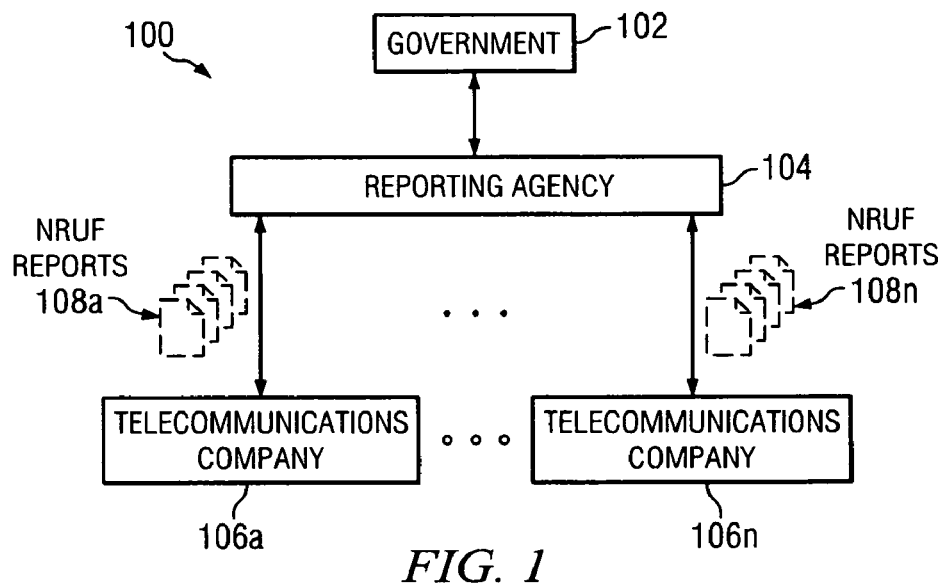
FIG. 1 is an illustration of an exemplary organizational structure for fulfilling governmental telecommunications telephone number usage reporting requirements.

FIG. 1 is an illustration of an exemplary organizational structure for fulfilling governmental telecommunications telephone number usage reporting requirements. As shown, a governmental organization, such as the Federal Communications Commission (FCC), sets guidelines and mandates for the telecommunications industry for reporting telecommunications usage. The telecommunications usage includes telephone number usage so that planning of additional phone numbers across the United States may be adequately planned to avoid reaching a telephone number exhaust situation in any particular region.

To help manage the reporting by the telecommunications industry, a reporting agency 104, currently known as the North American Numbering Plan Administration (NANPA), has been established. Telecommunication companies 106a-106n (collectively 106) provide telecommunications services to customers, including using and managing telephone numbers. As mandated by the government, the telecommunications companies 106 are to file semi-annual Number Resource Utilization/Forecast Reports (NRUF) 108a-108n (collectively 108) that show telephone number utilization and forecasting of the telephone numbers for which the respective telecommunications companies are responsible.

FIG. 2 is a block diagram of a system configuration 200 for fulfilling governmental telecommunications telephone number usage reporting requirements. The system configuration includes a variety of servers and databases for use in storing and retrieving data associated with telecommunications usage.

Telecommunications servers 202a-202n (collectively 202) may be utilized to process telecommunications usage and forecasting of the respective companies by one or more telecommunications companies. Server 202a may include a processor 204 in communication with a memory 206 that is used for storing data and software and an input/output (I/O) unit 208 for communicating outside of the telecommunication server 202a. Software 210 may be executed by the processor 204 for performing data collection and processing of telecommunication usage and forecasting for the respective telecommunications company. A storage unit 212, which may be contained within the telecommunications server or located remotely from the telecommunications server 202a, is used to store telecommunications usage information in one or more databases 214a-214n (collectively 214). The databases 214 may store telephone numbers assigned to the telecommunications company and usage of those telephone numbers by customers of the telecommunications company. As shown, telecommunications server 202n may include the same or similar components as telecommunications server 202a and store data in an associated storage unit 216. In one embodiment, the telecommunications servers 202 are used by the same telecommunications company having one or more divisions located across several states and regions within each state, but manage information associated with each of the respective divisions in which the telecommunications servers operate.

As understood in the telecommunications community, a LERG server 218 is managed by Telcordia Technologies, Inc. to manage the LERG database 220a-220n (collectively 220). The LERG database 220 stores the North American Numbering Plan (NANP) which governs the management of telephone number resources for the public switched telephone networks in North America, including Canada, the United States, the Caribbean, and territories, within the international country code '1'. The LERG database 220 has data for every switch and central office in the North American telephone network. The LERG server 218 includes a processor 222 and software 224 for communicating with the LERG database 220. Memory 226 and an I/O unit 228 are in communication with the processor 222 for storing information and communicating with the LERG database 220 and with the telecommunications servers 202.

NeuStar® is an administrator of the thousands-block number pooling in the United States. As the pooling administrator, NeuStar has telecommunications companies 106 (FIG. 1) submit information to them about phone number resources that are allocated. Each telecommunications company submits the information for each NPA and rate center of the company. A NeuStar server 230 is operated by NeuStar. The NeuStar server 230 may include the same or similar components as the LERG server 218. The NeuStar server 230, however, operates to manage different databases 232a-232n (collectively, 232) stored on a storage system 234, which may or may not be a part of the NeuStar server 230. As understood, the NeuStar databases 232 may store information for all telecommunications companies, including forecasted demand, blocks assigned, blocks returned, blocks donated, blocks added to the pool from new codes, and blocks available, for example. This information collected by the NeuStar server 230 may aggregate the information to provide historical information to the telecommunications industry and forecast information for the telecommunications industry so that telephone number resources may be planned going forward and trends may be determined. Contents of the NeuStar databases 232 may be utilized in accordance with the principles and the present invention.

A NANPA server 236, which may include the same or similar components as the LERG server 218 may be used to manage information being submitted to NANPA from the telecommunications companies 106. The storage unit 238 may include databases 240a-240n (collectively 240) for storing the information. In one embodiment, the databases 240 store NRUF reports 108 (FIG. 1), which may be in the form of Excel spreadsheets, PDF images, or raw content as specified by NANPA. The NRUF reports stored in the databases 240 may be utilized by NANPA, the reporting agency 104 (FIG. 1), or other reporting agencies directed by the government to manage phone number resources in the United States.

Each of the servers shown may be in communication with one another via a network 242. In one embodiment, the network 242 is the Internet. Alternatively, other public or private networks, including wired, wireless, satellite, or any other configuration may be utilized in accordance with the principles and the present invention for providing communication services between each of the servers. As shown, communication over the network 242 is performed via data packets 244*a*-244*n* as understood in the art. Other types of communication protocols may be utilized in accordance with the principles and present inventions. While only three databases, the LERG database 220, NeuStar database 232, and NANPA database 240 are shown, it should be understood that other and/or additional databases that provide information associated with the telecommunications industry and including information for use in completing NRUF reports may be utilized.

FIGS. 3A-3D are exemplary completed NRUF forms. The forms are used for reporting telephone number usage by each of the telecommunications companies 106. A complete NRUF report contains 12 forms for collecting utilization and forecast data from telecommunications carriers. However, only four of the twelve are provided for exemplary purposes because many of the others are not utilized or seldom utilized due to being used for specific purposes or seldom including information that needs to be reported. It should be understood that the principles of the present invention may be utilized for completing a full NRUF report.

FIG. 3A is an exemplary form U1 Utilization Reporting Form (for non-rural primary carriers). This form is used for non-rural primary carriers to report at the thousands block level per rate center. This form, as well as the other NRUF forms, are configured in Microsoft Excel® and include a header portion 302 for the telecommunication company to enter company information in tables 304 and 306. The information provided may include service provider name, company address, city, state, zip code, contact name, contact telephone number, service provider OCN, service provider federal registration number (FRN), and service provider service type.

Another table 308 that includes numbering resource utilization for each thousands or 1K block is completed by each telecommunications company 106 (FIG. 1). The information to be reported includes NPA-NXX, thousands digit ("X"), rate center abbreviations, assigned numbers, intermediate numbers, reserved numbers, aging numbers, administrative numbers, donated to pool indicators, notes/assignee information, available numbers, utilization percentages, errors/messages, etc. The first ten columns are filled in by the telecommunications carriers based on utilization by customers being supported in each NPA-NXX-X (i.e., first two columns of table 308). Available numbers, utilizations, and errors/messages are computed based on the resources being utilized by the telecommunications company for each NPA-NXX-X.

Five categories are required to be reported in the U1 Utilization Reporting Form, including "assigned," "intermediate," "reserved," "aging," and "administrative." These categories are defined in FCC Order 00-104. A sixth category, "available," is automatically calculated and no entry is necessary. Clicking on a soft-button 310 causes the "available" data to be checked before submission. It should be understood that the forms provided in FIGS. 3A-3D are provided by the reporting agency 104 (FIG. 1) to each telecommunications company 106 for reporting numbering resource utilization and forecasting. One embodiment in accordance to the principles of the present invention provides for determining the utilization of the different categories (e.g., "assigned").

Definitions for the different utilization categories as described in the NRUF report are provided herein below for convenience purposes:

Assigned: Assigned numbers are defined as "numbers working in the public switched telephone network under an agreement such as a contract or tariff at the request of specific end users or customers for their use, or numbers not yet working but having a customer service order pending. Numbers that are not yet working and have a service order pending for more than five days shall not be classified as assigned numbers."

Intermediate: Intermediate numbers are defined as "numbers that are made available for use by another telecommunications carrier or non-carrier entity for the purpose of providing telecommunications service to an end user or customer." "An exception to this requirement is numbers reported for the purpose of transferring an established customer's service to another service provider, in which case the numbers are classified as "assigned" by the reporting carrier and not counted by the receiving carrier. For intermediate numbers provided by carriers to non-carrier entities, the providing carrier must report utilization for these numbers. Numbers assigned to end users by a non-carrier entity should be reported by the providing carrier as "assigned". Any remaining numbers held by a non-carrier entity that are not assigned to end users shall be reported by the providing carrier as "intermediate." The sum of numbers reported by the carrier for the non-carrier entity in these two categories should always equal the total of numbers held by the non-carrier entity.

Reserved: Reserved numbers are defined as "numbers that are held by service providers at the request of specific end users or customers for their future use." Numbers held for specific end users or customers more than 180 days shall not be classified as reserved numbers.

Aging: Aging numbers are defined as "disconnected numbers that are not available for assignment to another end user or customer for a specific period of time." "Numbers previously assigned to residential customers may be aged for no more than 90 days. Numbers previously assigned to business customers maybe aged for no more than 365 days."

Administrative: Administrative numbers are defined as "numbers used by telecommunications carriers to perform internal administrative or operational functions necessary to maintain reasonable quality of service standards."

Donated to Pool: An "X" is entered in this column if the NPA-NXX-X block has been donated to a pool.

FIGS. 3B-3D show exemplary forms F-1*b*, F-2*b*, and F-3, respectively. These forms are used to report forecasting of telephone number resources. More specifically, Form F-1*b* is used for pooling carriers to report forecasts for each NPA and rate center, Form F-2*b* is used for non-pooling carriers in pooling areas for forecasting for each NPA, and Form F-3*b* is used for carriers in non-pooling areas for forecasting for each NPA and rate center. Similar to FIG. 3A, multiple tables are provided in each of FIGS. 3B-3D for header information and reporting information. It should be understood that one skilled in the art of telecommunications resource reporting is well versed in utilizing these resource utilization and forecast report forms.

FIG. 3B is an exemplary Form F-1*b* that is part of the NRUF Report submitted on a semi-annual basis by telecommunications service providers 106 (FIG. 1). Pooling carriers, where a pooling carrier is a telecommunications carrier that has pooled telephone number resources in certain rate center locations, fill Out Form F-1*b* when submitting the NRUF Report. Form F-1*b* includes a header portion with tables 314 and 316 that is filled out with information associated with the telecommunications service provider, such as parent company name, service provider name, address, service provider operator company number (OCN), service provider federal registration number, service type, etc. In addition, telecommunications service providers 106 fill out a forecast table 318 for forecasting pooling areas in 1K blocks per rate center, per year and 1K blocks (growth codes) over the next five years. It will be seen that this forecasting is different from forms F-2*b* (FIG. 3C) and forms F-3*b* (FIG. 3D) as form F-1*b* requests forecasting for 1K blocks, whereas forms F-2*b* and F-3*b* request forecasting for 10K blocks (i.e., NXX level blocks). Also, forecasting information associated with each rate center in an NPA is submitted in Form F-1*b*.

FIG. 3C is an exemplary Form F-2*b* that is part of the NRUF Report. Non-pooling carriers, where a non-pooling carrier is a telecommunications carrier that has not pooled telephone number resources in certain rate center locations, fills out Form F-2*b* when submitting the NRUF Report. The Form F-2*b* includes a header portion having tables 320 and 322 to be filled with information associated with the telecommunications service provider, as described with regard to Form F-1*b* of FIG. 3B. The telecommunications service providers 106 fill out a forecast table 324 for forecasting NXX(s) per rate center, per year (growth codes) over the next five years. As shown, the forecast table 324 requests NPA and rate centers, but is performed on a 10K block level as opposed to the 1K block level of Form F-1*b* (FIG. 3B).

FIG. 3D is an example Form F-3*b* that is part of the NRUF Report. Telecommunications carriers in non-pooling areas, which are areas in which pooling has not been initiated yet, fill out Form F-3*b* when submitting the NRUF Report. The Form F-3*b* includes a header portion including tables 326 and 328 to be filled out with information associated with the telecommunications service provider, as described with regard to FIG. 3B. The telecommunications service providers 106 fill out a forecast table 330 for forecasting NXX(s) per NPA, per year (growth codes) over the next five years. As shown, the forecast table 328 requests NPAs and is performed on a 10K block level as opposed to the 1K block level of form F-1*b* (FIG. 3B).

As understood in the art, the telecommunications carriers may use respective proprietary inventory databases (e.g., databases 214) to generate at least a portion of the information used for generating utilization and forecasting information to complete the NRUF forms.

Figure 4:
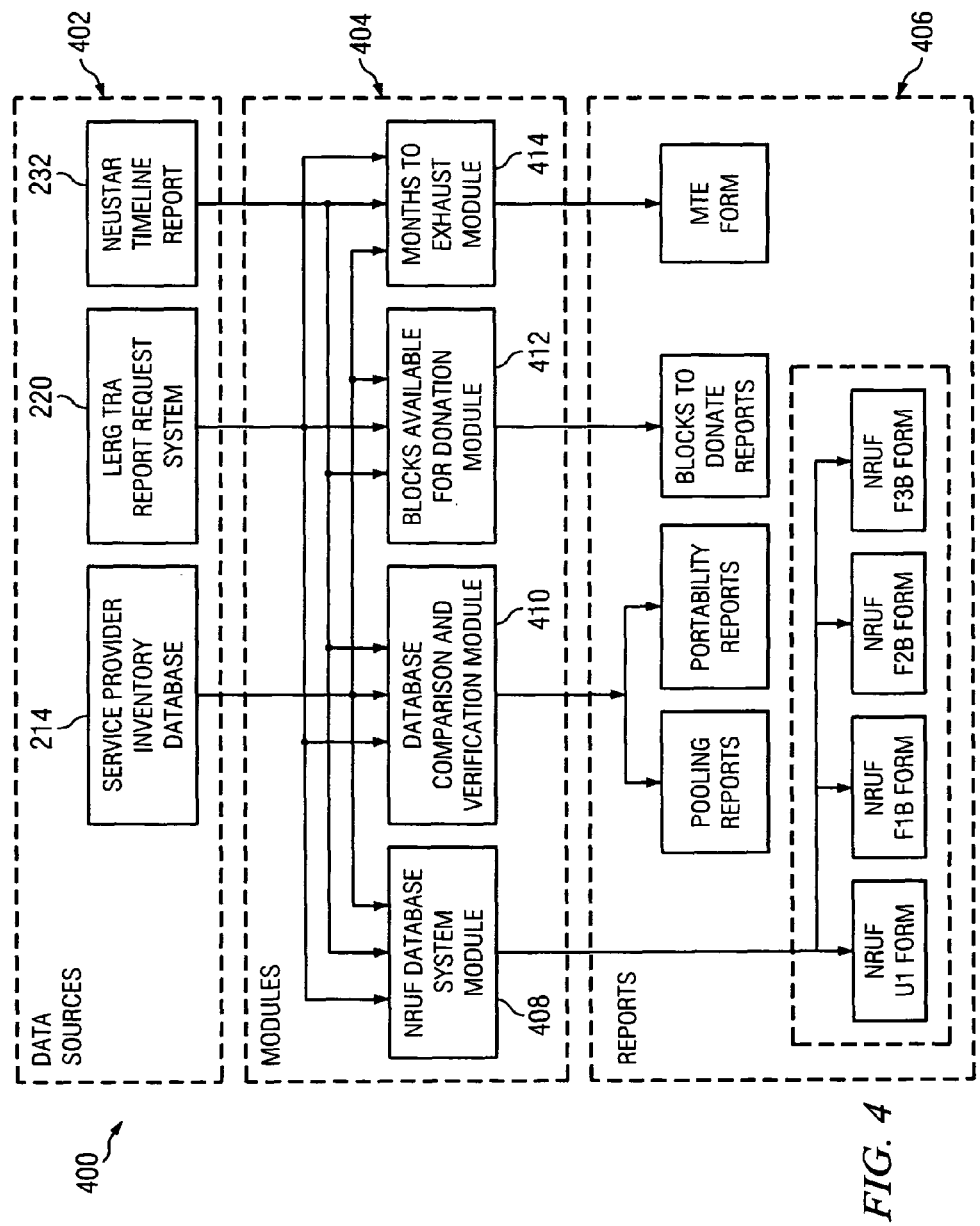
FIG. 4 is a block diagram of an exemplary system for gathering and processing information to complete NRUF forms.

FIG. 4 is a block diagram of an exemplary system 400 for gathering and processing information to complete the NRUF forms. The system may include data sources 402, modules 404, and reports 406. The data sources 402 may include a telecommunications service provider inventory database 214, LERG database 220, and NeuStar database 232. As shown in FIG. 2, the LERG database 220 and NeuStar database 232 are accessible via a network 242, such as the Internet. It should be understood that other databases currently available or developed in the future that include information available to be used to determine information for completing the NRUF forms may be utilized in accordance with the principles of the present invention.

The modules 404 include an NRUF database system module 408, database comparison and verification module 410, blocks available for donation module 412, months to exhaust module 414, and directory numbers available module 416. While the NRUF database system module 408 is of principal focus for completing the four NRUF forms of FIGS. 3*a*-3D, the other modules are briefly described hereinbelow.

NRUF Database System Module

The NRUF database system module 408 is used to collect and process information from the databases 214, 220, and 232 to fill-out the NRUF forms 418, which includes NRUF forms U1, F-1*b*, F-2*b*, and F-3*b*, as provided in FIGS. 3A-3D. The NRUF database system module 408 is the primary aspect of the remainder of this description.

Database Comparison and Verification Module

The database comparison and verification module 410 is a module used to extract information from both the telecommunications service provider database 214 and LERG database 220 and to compare the pooling statuses (i.e., every thousands block that the telecommunications service provider currently owns or had owned in the past) as well as the portability indicators stored in the respective databases. A report may be generated to shows all thousands blocks where there is a discrepancy between the sources.

Blocks Available for Donation Module

The blocks available for donation module 412 queries several data sources 402 to first find all thousands blocks currently owned by a telecommunications service provider that are at or less than 10% utilized or contaminated. In other words, if 100 or less of the 1000 numbers in the thousands block are currently unavailable for assignment, the thousands block is not considered to be over-contaminated. By being 10% or less utilized, the block is capable of being pooled back to the government. However, the telecommunications service provider would not necessarily want to donate all blocks in a rate center that are under-contaminated. The second factor that should be accounted for is the projected growth of a rate center. The telecommunications service provider should donate only enough thousands blocks to ensure that a rate center will not exhaust all phone numbers in the rate center within the next six months. This number of thousands blocks to donate is what a report from this module 412 illustrates. This module 412 lists the current under-contaminated thousands blocks and their respective percent utilizations. Users may filter results based on NPA, state, and rate center combinations.

Months to Exhaust Module

The months to exhaust module 414 automates the process for populating a Months-to-Exhaust Worksheet, which must be completed when a telecommunications carrier requests additional thousands blocks for growth in a rate center where the carrier already has resources assigned. It extracts information from both the telecommunications service provider database 214 and LERG database 220. The module then uses queries to group, subtotal, and filter data to meet the requirements for the worksheet. Calculations are automated to determine whether the six months to exhaust requirement and the minimum 75% utilzation requirement are met.

Continuing with FIG. 4, the NRUF database system module 408 maybe configured to query one or more databases to receive information for processing and completing NRUF forms. As shown, the NRUF forms, U1, F-1*b*, F-2*b*, and F-3*b*, may be completed by the NRUF database system module 408. However, it should be understood that the NRUF database system module 408 may be adapted to complete other NRUF forms in the same or similar manner.

Figure 5A:
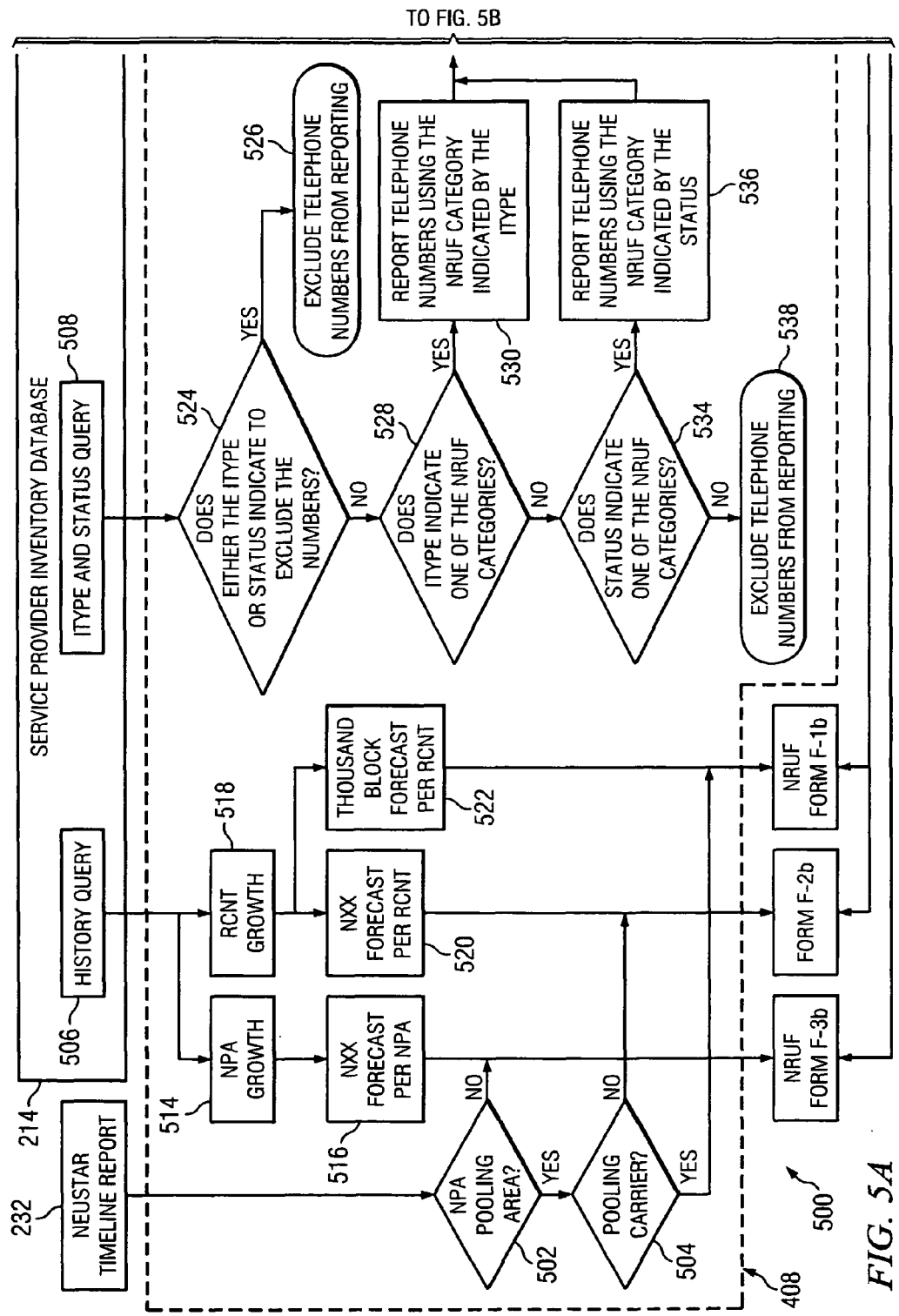
FIGS. 5A and 5B are more detailed block diagram of the exemplary system of FIG. 4 for gathering and processing information to complete NRUF forms.
Figure 5B:
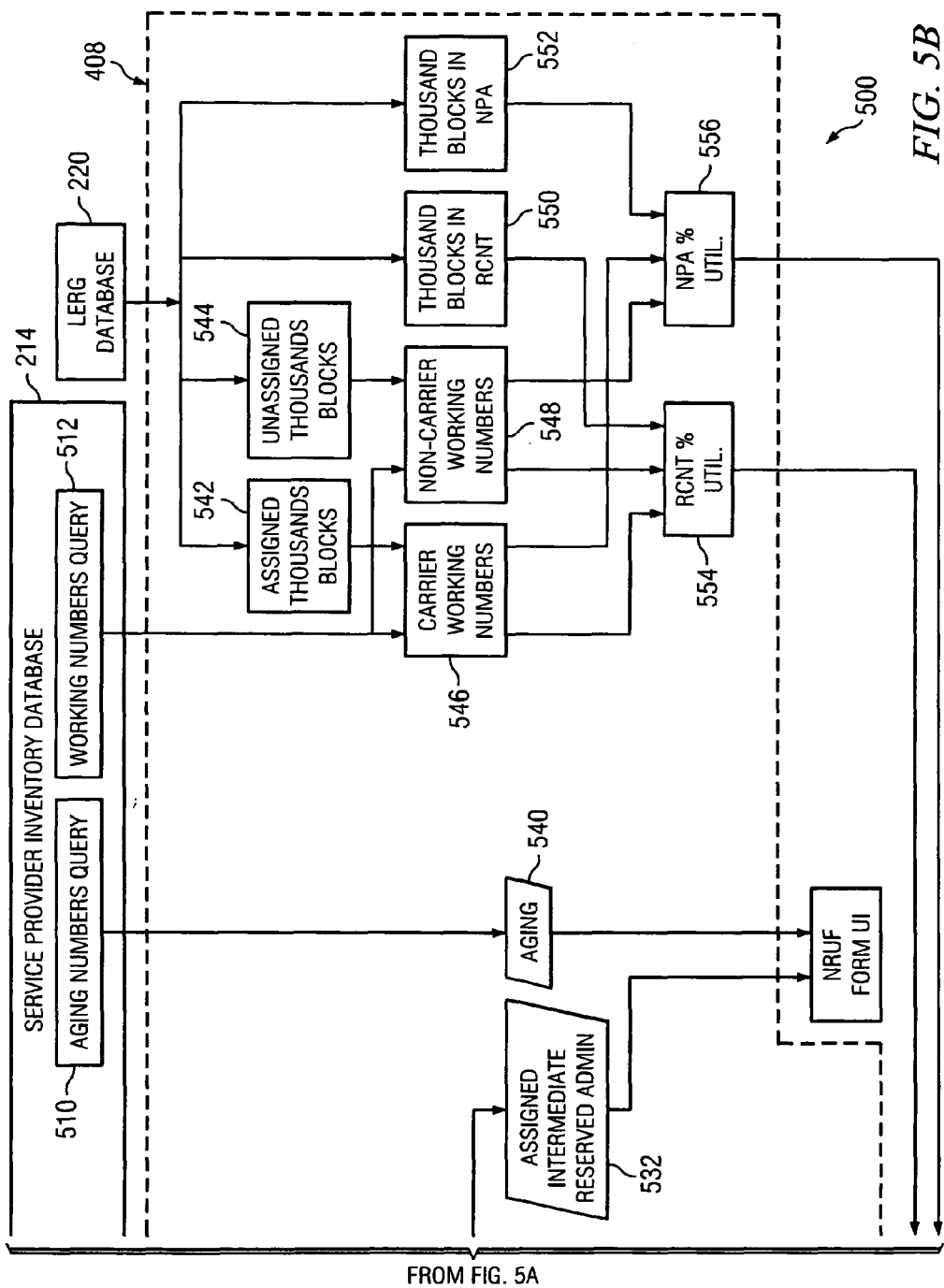

FIG. 5 is a more detailed block diagram 500 of the exemplary system of FIG. 4 for gathering and processing information to complete an NRUF report. As shown, three databases, including the service provider inventory database 214, LERG database 220, and NeuStar Timeline Report 232, may be accessed to obtain information to be used for completing the NRUF report. In one embodiment, two or more databases may be accessed, including an internal database to the service provider and a telecommunications industry accessible database (e.g., the LERG database 220), if enough information can be gathered from these databases to complete the NRUF report. However, based on the current configurations of the three databases, each is accessed to complete the NRUF reports in accordance with the principles of the present invention.

As previously described, (i) pooling carriers (i.e., those carriers in pooling areas who have donated or received numbers from the number pool) report forecasts by rate center on the F-1*b* form, (ii) non-pooling carriers in pooling areas (i.e., carriers in pooling areas who have not donated or received numbers from the number pool report forecasts by rate center on the F-2*b* form, and (iii) carriers operating in non-pooling areas (i.e., NPA areas that have not yet started pooling) report forecasts in NPA areas on the F-3*b* form. The determination as to which forms to report projections for particular NPA areas may be determined using the NeuStar database 232 and looking up the NeuStar Timeline Report. At this time, the NeuStar timeline Report can be found at:

"https://www.nationalpooling.com/pas/control/timelinereport?siteTyp=FR"

In one embodiment, the database or table that is stored at the above-listed website may be searched at the website. Alternatively, the contents of the database may be downloaded into a local software program (e.g., Microsoft Excel®) or database (e.g., Microsoft Access®) and queried therein.

In step 502, a query may be performed on the data from the NeuStar database 232 to determine whether an NPA is a pooling area. The NeuStar timeline Report (not shown) includes, in part, state, NPA, and pool start date information. If the pool start date listed is prior to the current date, then the NPA is a pooling area. Otherwise, the NPA is a non-pooling area and Form F-3*b* is completed for those NPA areas. Unless an NPA is relatively new, most NPA areas are pooling areas, which is why the Form F-3*b* in FIG. 3D is empty. If the query in step 502 determines that the NPA is a pooling area, then in step 504, a query determines whether the telecommunications service provider is a pooling carrier in that NPA. In other words, a determination is made to determine if the service provider has ever pooled in the NPA. If so, then a forecast for the NPA is reported in Form F-1*b*. Otherwise, a forecast for the NPA is reported in Form F-2*b*.

As shown, four queries may be performed with the service provider inventory database, including a history query 506, installed type ITYPE & status query 508, aging numbers query 510, and working numbers query 512. The history query 506 and working numbers query 512 are used to complete Forms F-1*b*, F-2*b*, and F-3*b* and the other queries 508 and 510 are used to complete the U1 Form.

The history query 506 extracts or identifies the number of working phone numbers at rate center levels for each of the last 13 months from the service provider inventory database 214. TABLE I is representative of a portion of such an extraction. It should be understood that TABLE I is an exemplary portion of an overall database that includes working telephone numbers for all rate centers and NPAs of the telecommunications service provider. At step 514, NPA growth is determined for inclusion in form F-3*b*, if it is determined from step 502 that the NPA is not a pooling area. For example, referring to TABLE I below, if the current month is June 2006, month 13 (M13) would be the previous month (e.g., May 2006) since the current month is not complete. Month 1 (M1) would be May 2005. By using a rolling 13 months of history, month 1 can be subtracted from month 13 to derive the past year of growth (positive) or loss (negative). In the example of TABLE I, assuming that Decatur is the only rate center reported by the service provider, the growth of the NPA 940 is 22,886−21,316=1,570 phone number growth. If there are multiple rate centers served in this NPA, the working numbers would first be subtotaled at the NPA level. At step 516, an NXX forecast per NPA may be determined. The results are included in Form F-3*b* if the NPA is not a pooling area.

TABLE I

Working Numbers at Rate Centers Table

| ST | Rate Center | NPA | YRMO | Working |
|---|---|---|---|---|
| TX | DECATUR | 940 | M13 | 22886 |
| TX | DECATUR | 940 | M12 | 22887 |
| TX | DECATUR | 940 | M11 | 22875 |
| TX | DECATUR | 940 | M10 | 22841 |
| TX | DECATUR | 940 | M9 | 21741 |
| TX | DECATUR | 940 | M8 | 21781 |
| TX | DECATUR | 940 | M7 | 21801 |
| TX | DECATUR | 940 | M6 | 21871 |
| TX | DECATUR | 940 | M5 | 21879 |
| TX | DECATUR | 940 | M4 | 22647 |
| TX | DECATUR | 940 | M3 | 22641 |
| TX | DECATUR | 940 | M2 | 22098 |
| TX | DECATUR | 940 | M1 | 21316 |

At step 518, rate center growth maybe determined based on the information from TABLE I in a similar manner as the NPA growth described with respect to step 514. In this case, rate center growth is calculated in the same manner and is the same as NPA growth (i.e., 1,570 phone numbers). If a service provider reported on multiple rate centers servicing a single NPA, which is often the case, then the growth for the rate center and NPA would likely be different. At step 520, an NXX forecast per rate center is generated. In one embodiment, the growth may be projected by using the same growth as computed for the past 13-months (i.e., 1,570 phone lines). Alternatively, a different technique may be used for projecting the growth, such as using a moving average or other statistical function. The results of the NXX forecast per rate center may be applied to Form F-2*b* if it is determined at step 504 that the carrier is not a pooling carrier. If it is determined that the carrier is a pooling carrier, then the results of step 522, which determines the thousands block forecast per rate center, is applied to Form F-1*b*.

Continuing with the queries, the ITYPE & status query 508 reports subtotals for combinations of installed type and status at the NPA-NXX-X (thousands block) level. When blocks of telephone numbers are assigned to a carrier, the services for which the numbers can be used are limited. For example, a block of numbers may be assigned for paging services only. Assigning an installed type to numbers in a carrier's inventory database allows the carrier to follow regulations in assigning the numbers. The status field serves to report the current status of the phone number. For example, the status defines directory numbers that are assigned to working customers and those that are currently unassigned.

TABLE II is an exemplary partial listing of a telecommunications service provider inventory of telephone numbers. The list includes NPA-NXX-X, installation type, status, and quantity of numbers with a particular status. For example, the status "ASN" stands for "assigned," and there are four (4) phone numbers in the NPA-NXX-X of 219-261-2 that are assigned.

TABLE II

Service Provider Inventory Database

| NPA | NXX | X | ITYPE | STATUS | QTY |
|---|---|---|---|---|---|
| 219 | 261 | 0 | REG | WKG | 1 |
| 219 | 261 | 0 | SPL | WKG | 1 |
| 219 | 261 | 2 | COIN | ASN | 4 |
| 219 | 261 | 2 | COIN | VAC | 1 |
| 219 | 261 | 2 | COIN | VND | 23 |
| 219 | 261 | 2 | COIN | WKG | 72 |
| 219 | 261 | 2 | REG | DNA | 1 |
| 219 | 261 | 2 | REG | LNPO | 2 |
| 219 | 261 | 2 | REG | VAC | 1 |
| 219 | 261 | 2 | REG | VND | 153 |
| 219 | 261 | 2 | REG | WKG | 741 |
| 219 | 261 | 2 | REG | WLNP | 2 |

TABLE III is a cross-reference table for the different ITYPE categories. For example, the ITYPE "BBDN" represents "broadband" service and "REG" represents "regular" service of customer telephone lines. TABLE IV is a cross-reference table for the status categories. For example, "ASN" represents phone numbers that are "assigned" and "WKG" represents phone numbers that have working service. Both of the ITYPE and status cross-reference tables are used in determining what information to report on the utility U1 form, as further described below with regard to the flow chart extending from the ITYPE & status query 508. It should be understood that TABLES III and IV are exemplary and that other and/or additional tables may be used in accordance with the principles of the present invention. It should also be understood that the content of the tables may be different or additional content may be utilized to perform the same or functionality as described herein. Furthermore, it should be understood that no tables may and cross-referencing of categories maybe performed by using software that includes cross-reference values by hard-coding or otherwise.

TABLE III

INSTALL TYPE CROSS-REFERENCE TABLE

| ITYPE | DESCRIPTION | EFFECT |
|---|---|---|
| 800 | 800 SERVICE | NO EFFECT |
| BBDN | BROADBAND | NO EFFECT |
| CNTX | CENTREX NUMBERS | NO EFFECT |
| COIN | COIN | NO EFFECT |
| DID | DIRECT IN DIAL SVC | NO EFFECT |
| ISDN | INT SWITCH DIG NETWK | NO EFFECT |
| LNPI | LNP IN | EXCLUDE |
| MBAS | MILITARY BASE | NO EFFECT |
| MBEX | MILITARY PIN/NO DIAL | EXCLUDE |
| MCA | METRO CALLING AREA | NO EFFECT |
| MEXT | MESSAGE LINE EXT. | EXCLUDE |
| MSGL | MESSAGE LINE NUMBER | NO EFFECT |
| PAGE | PAGING | NO EFFECT |
| POOL | NUMBER POOLING | NO EFFECT |
| RECL | RECLAIMED | NO EFFECT |
| REG | REGULAR | NO EFFECT |
| SPL | SPECIAL BILLING (WO) | NO EFFECT |
| STGV | STATE GOVERNMENT NMBR | INTERMEDIATE |
| TEST | TEST | ADMINISTRATIVE |
| TLCO | COMPANY OFFICIAL NM | ADMINISTRATIVE |
| TNBR | TOTAL NUMBER SERVICE | NO EFFECT |
| NSTR | NEUSTAR'S BLOCK | NO EFFECT |
| PATS | CUSTOMER OWNED PHONE | NO EFFECT |
| PCS | PERSONAL COMM SVC | NO EFFECT |
| ROT | ROTARY HUNT | NO EFFECT |

TABLE III-continued

INSTALL TYPE CROSS-REFERENCE TABLE

| ITYPE | DESCRIPTION | EFFECT |
|---|---|---|
| SWAD | TEST | ADMINISTRATIVE |
| WATS | OUT WATS | NO EFFECT |

TABLE IV

STATUS CROSS-REFERENCE TABLE

| STATUS | DESCRIPTION | EFFECT |
|---|---|---|
| ASN | ASSIGNED | ASSIGNED |
| CEAS | PORTED # DATABASE | ASSIGNED |
| DNA | DO NOT ASSIGN | ADMINISTRATIVE |
| JPY | JEOPARDY | ASSIGNED |
| LNPO | LNP OUT | ASSIGNED |
| RECL | RECLAIM SD | EXCLUDE |
| RES | RESERVED | RESERVED |
| SND | SENDING TO VND | EXCLUDE |
| VAC | VACANT | EXCLUDE |
| VACR | VACANT RELATED ORDER | ASSIGNED |
| VND | VACANT NUMBER DATABASE | EXCLUDE |
| WKG | WORKING SERVICE | ASSIGNED |
| WLNP | WORKING LNP SERVICE | ASSIGNED |
| CVR | CONNECT VACATION SVC | ASSIGNED |
| LNPP | LNP PENDING PORT | ASSIGNED |

Continuing with FIG. 5, the ITYPE & status query 508 accesses the service provider inventory database 214 to extract data, such as the data of TABLE II. The process continues at step 524, where a determination is made as to whether either the ITYPE or status indicates to exclude the numbers. For example, referring to TABLE II, for NPA-NXX-X of 219-261-2 having an ITYPE of "COIN" and status of "VND" (see row 5 of TABLE II), when the ITYPE cross-reference table (TABLE III) is cross-referenced, the effect for "COIN" is shown to have "NO EFFECT" (see row 4 of TABLE III) and when the status cross-reference table (TABLE IV) is cross-referenced, the effect for "VND" is "EXCLUDE" (see row 11 of TABLE IV). If at step 524 it is determined that either the ITYP or status is to be excluded, then at step 526, the telephone numbers are excluded from reporting. Therefore, in the instant example, the 23 phone numbers in 219-261-2 that have a status of "VND" are excluded from reporting.

If at step 524 it is determined that neither the ITYPE or status indicate to exclude the numbers, then at step 528, a determination is made as to whether the ITYPE indicates one of the five NRUF categories (i.e., "assigned," "intermediate," "reserved," "aging," "administrative"). For example, if one of the NPA-NXX-X ITYPE data elements were "TEST," then the effect would be found in TABLE III as being "ADMINISTRATIVE," which is one of the NRUF categories. If the ITYPE indicates one of the NRUF categories at step 528, then the process continues at step 530, where the number of telephone numbers using the NRUF category indicated by the ITYPE is reported. The process continues at step 532 to report the number of telephone numbers that meets one of the categories "Assigned," "Intermediate," "Reserved," or "Administrative" on the U1 form.

If it is determined at step 528 that the ITYPE is not one of the NRUF categories (e.g., "NO EFFECT"), then the process continues at step 534, where a determination is made as to whether the status is one of the NRUF categories. For example, referring to TABLE II, for NPA-NXX-X of 219-261-2 having ITYPE and status of "COIN" and "ASN," the effect found in TABLE IV is "ASSIGNED," which is one of the NRUF categories. If it is determined at step 534 that the status is an NRUF category, then the process continues at step 536 where the number of telephone numbers using the NRUF category indicated by the status is reported. For the case of 219-261-2 having ITYPE and status of "COIN" and "ASN," there are 4 telephone numbers that are reported. As another example, referring to TABLE II, for NPA-NXX-X of 219-261-2 having ITYPE and status of "REG" and "WKG," the quantity of 741 numbers are reported as being "ASSIGNED" on the U1 Form (FIG. 3A). The process continues at step 532 to report the numbers on the U1 form If, at step 534, the status does not indicate one of the NRUF categories, then the process continues at step 538, where the telephone numbers are excluded from reporting.

Continuing with the queries, the aging numbers query 510 is used to report subtotals for aging numbers at an NPA-NXX-X (thousands block) level. TABLE V shows a subset of the service provider inventory database 214 with aging data. The aging data is reported via step 540 on the U1 Form (FIG. 3A).

TABLE V

Inventory Data with Telephone Number Aging Information

| NPA | NXX | X | AGING |
|-----|-----|---|-------|
| 219 | 261 | 2 | 46 |
| 219 | 261 | 3 | 22 |
| 219 | 261 | 4 | 3 |
| 219 | 275 | 2 | 4 |
| 219 | 275 | 3 | 9 |
| 219 | 275 | 4 | 7 |
| 219 | 275 | 5 | 8 |
| 219 | 275 | 6 | 3 |

Continuing with the queries, the working numbers query 512 reports working numbers at the NPA-NXX-X (thousands block) level that are designated as being working. TABLE VI shows a subset of the service provider inventory database 214 with working telephone number data. The working numbers are used in combination with the data from the LERG database 220.

TABLE VI

Inventory Data with Working Telephone Number Information

| NPA | NXX | X | WORKING |
|-----|-----|---|---------|
| 218 | 534 | 0 | 33 |
| 218 | 534 | 1 | 74 |
| 218 | 534 | 2 | 69 |
| 218 | 534 | 3 | 569 |
| 218 | 534 | 4 | 97 |
| 218 | 534 | 5 | 79 |
| 218 | 534 | 7 | 18 |
| 218 | 534 | 9 | 72 |

At step 542 and 544, assigned thousands blocks (i.e., blocks currently allocated to the reporting carrier) and unassigned thousands blocks (i.e., blocks not currently allocated to the reporting carrier), respectively, are collected from the LERG database 220. Carrier working numbers (i.e., the reporting carrier's working customers whose numbers reside in a thousand block owned by the reporting carrier) are determined at step 546 and non-carrier working numbers (i.e., the reporting carrier's working customers whose numbers do not reside in a thousand block owned by the reporting carrier) are determined at step 548. Thousand blocks in each rate center (i.e., the number of thousands blocks owned by the reporting carrier for each rate center) are determined at step 550 and thousand blocks in each NPA (i.e., the number of thousands blocks owned by the reporting carrier for each NPA) are determined at step 552. Rate center percent utilization is determined at step 554 and NPA percent utilization is determined at step 556. These values are used to complete the NRUF Forms F-1$b$, F-2$b$, and F-3$b$.

$$RTCTR\%Util = \frac{CarrierWkg + NonCarrierWkg}{NonCarrierWkg + (1000)(ThouBlocksInRateCenter)}$$

$$NPA\%Util = \frac{CarrierWkg + NonCarrierWkg}{NonCarrierWkg + (1000)(ThouBlocksInNPA)}$$

The principles of the present invention determine which thousands blocks the company is responsible to report utilizing information stored in the LERG database 220. For example, with number portability and number pooling, Company A may have customers in thousands blocks that are owned by Company B. Company A should not report utilization for these thousands blocks because Company B will report those numbers. To determine which blocks should be reported, the LERG database 220 is used as the determining data source. All blocks that are listed in the LERG have a corresponding operating company number (OCN). All thousands blocks listed in the LERG database 220 with an OCN that belongs to a particular carrier should be reported in the carrier's NRUF filings. However, this criteria alone does not include all necessary thousands blocks. If all of the thousands blocks in a NPA-NXX belong to one carrier and the blocks have not been pooled, then only the NPA-NXX shows up in the LERG database 220 rather than one record for each thousands block. To compensate for this, the process 500 splits these NPA-NXX's into all ten thousands blocks (0 through 9) for the blocks to report. Those blocks that were once owned by a company and donated back to the government without yet being reassigned should also be reported on the company's NRUF filings. These blocks are determined by meeting the following three conditions:

1) The NPA-NXX is listed in the LERG database 220 with one of the company's OCN's.
2) The NPA-NXX is split out in the LERG database 220 to include one or more thousands blocks, rather than just one record for the whole NPA-NXX.
3) One or more of the thousands blocks for the NPA-NXX's is not listed in the LERG database 220.

If each of these conditions is met, then those blocks not listed in the LERG database 220 are the additional blocks that should be included in the list of blocks to report. These blocks are marked with an "X", indicating that the block has been pooled.

In the following example shown in TABLE VII, for NPA-NXX 419-520, a telecommunications company having OCN 0661 is the code holder of the NPA-NXX as indicated by the first line with a block ID of "A" for all. Since the thousand blocks are broken out into individual records, but only eight of the ten blocks are listed in the LERG database 220, this means that blocks 7 and 9 are unassigned blocks. The blocks 7 and 9 have been pooled by one company, but not yet reassigned to another company, so these blocks are still to be reported by the pooling company. Blocks 5 and 8 have been pooled and reassigned to a company other than the pooling company having OCN 553A, so these blocks are not be reported by the pooling company.

TABLE VII

Pooling Example

| State | Rate Center | NPA | NXX | Block_ID | OCN |
|---|---|---|---|---|---|
| OH | MANSFIELD | 419 | 520 | A | 0661 |
| OH | MANSFIELD | 419 | 520 | 0 | 0661 |
| OH | MANSFIELD | 419 | 520 | 1 | 0661 |
| OH | MANSFIELD | 419 | 520 | 2 | 0661 |
| OH | MANSFIELD | 419 | 520 | 3 | 0661 |
| OH | MANSFIELD | 419 | 520 | 4 | 0661 |
| OH | MANSFIELD | 419 | 520 | 5 | 553A |
| OH | MANSFIELD | 419 | 520 | 6 | 0661 |
| OH | MANSFIELD | 419 | 520 | 8 | 553A |

Therefore, for reporting utilization in this example, the following thousands blocks and pooling indicators shown in TABLE VIII are reported:

TABLE VIII

Pooling Reporting Example

| NPA_NXX_X | RATE_CTR | POOL |
|---|---|---|
| 419-520-0 | MANSFIELD | |
| 419-520-1 | MANSFIELD | |
| 419-520-2 | MANSFIELD | |
| 419-520-3 | MANSFIELD | |
| 419-520-4 | MANSFIELD | |
| 419-520-6 | MANSFIELD | |
| 419-520-7 | MANSFIELD | X |
| 419-520-9 | MANSFIELD | X |

Figure 6:
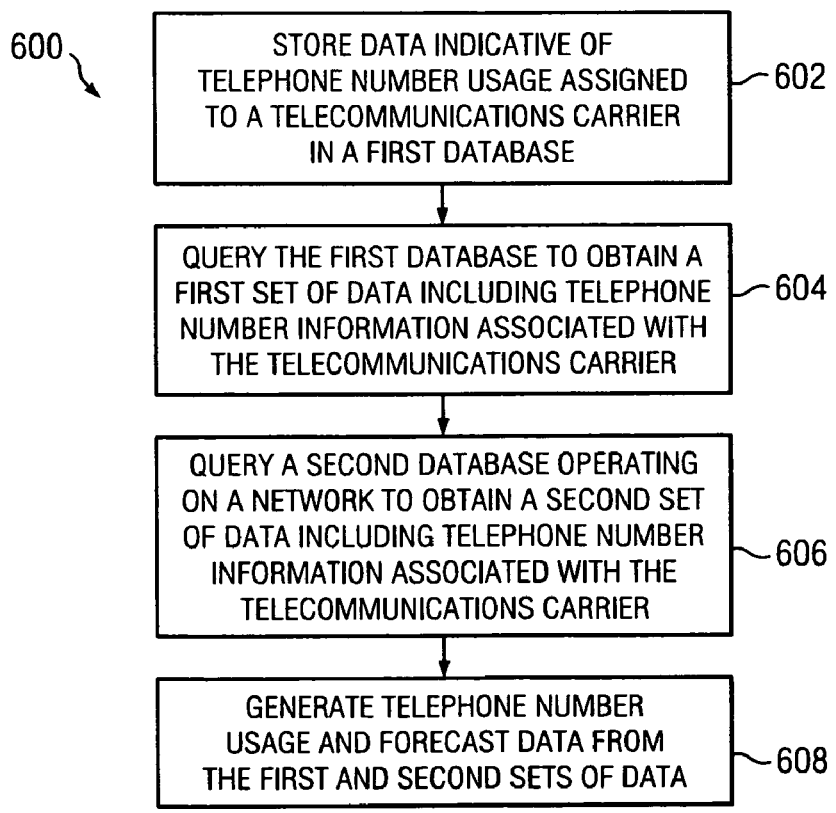
FIG. 6 is a flow diagram of an exemplary process for reporting telecommunications usage and forecasting.

FIG. 6 is a flow diagram of an exemplary process 600 for reporting telecommunications usage and forecasting. At step 602, data indicative of telephone number usage assigned to a telecommunications carrier is stored in a first database. In one embodiment, the first database is a proprietary database managed by the telecommunications carrier. At step 604, the first database may be queried to obtain a first set of data including telephone number information associated with the telecommunications carrier. At step 606, a second database operating on a network may be queried to obtain a second set of data including telephone number information associated with the telecommunications carrier. In one embodiment, the second database may be a database managed for the telecommunications industry, such as the LERG database. At step 608, telephone number usage and forecast data may be generated from the first and second sets of data. The telephone number usage and forecast data may be used for completing NRUF forms. A third database may also be queried to retrieve information that may assist in determining which form of the NRUF forms to apply the telephone number usage and forecast data.

Using the system and methods described above, the time for completing NRUF reports may be reduced from several weeks to less than an hour. In addition, business information that was otherwise too difficult to accumulate during reporting periods are now able to easily be collected and reported for business purposes. Also, forecasting is improved from conventional forecasting, where the principles of the present invention may forecast by using, in one embodiment, the growth over the past 12 months to project the next 12 months rather than simply using a flat number as may previously have considered to be acceptable.

Determining Months to Exhaust

Telecommunications carriers that wish to obtain additional telephone numbers for a rate center must submit a request to the Pooling Administrator (PA). When the Pooling Administrator, currently NeuStar, receives a carrier's request for additional telephone numbers, a determination is made as to whether or not the request will be granted. Two criteria must be met for additional numbering resources to be granted. First, the total rate center utilization must currently be at or above 75%. Second, based on the forecasted number growth and current numbering resources, the months to exhaust must be 6 months or less.

As an example for determining months to exhaust, current rate center utilization for Decatur, Tex. is 75.87%, which meets the first criteria (i.e., total rate center utilization at or above 75%). Based on the forecasted growth and the total numbering resources, the months to exhaust is 43.62. Because the months to exhaust is above six months, the rate center's telephone numbers will not be exhausted in the next six months, and, therefore, a request for additional telephone numbers, generally in the form of thousands blocks, would not be granted.

Continuing with the example, suppose that a large customer of the rate center is building their headquarters in the area and requests 5000 consecutive phone numbers. This additional request is to be factored in to the calculations for determining months to exhaust. If the special 5000 number request was for one of the next six months, this number would be added to the average growth for that month. The additional utilization greatly increases the "average monthly forecast" for the next six months, which is used in the months to exhaust calculation below. In turn, the months to exhaust number is reduced to 5.78 months for this example. Now both required criteria are met (i.e., current rate center utilization at or above 75% and months to exhaust below six months), so the request should be granted.

FIGS. 7A and 7B are graphical user interfaces of exemplary Months to Exhaust and Utilization Forms with data representative of the two examples described above. The forms 700a and 700b include a variety of selectable information, such as state 702 and rate center 704, and displayed information, including operator company number (OCN) 706. Based on the state 702 and rate center 704, a list 708 of rate center NPA-NXX's and list 710 of thousands block utilization are provided. A numbering resources entry table 712 displays calculated utilization information, including available numbers, assigned numbers, total numbering resources, and percent (%) utilization. A months to exhaust value is automatically calculated based on current utilization and forecasted growth. In addition a customer requested numbers field 714 is provided to allow a telecommunications carrier to enter a number of specially requested telephone numbers out of the ordinary type of growth. A growth history table 716 and forecast table 718 display the growth for the previous 12 months and the generated forecast for the following 12 months.

The difference between forms 700a and 700b is the customer requested numbers shown in field 714, where in form 700a, there are no customer requested numbers and in form 700b, there are 5000 customer requested numbers. As described in the example above, 5000 customer requested numbers represent a special request from a customer to have 5000 telephone numbers reserved for the establishment of a headquarters or other business operation. The other numbers of utilization are the same with the exception of months to exhaust (i.e., 43.62 months versus 5.78 months). This difference enables the telecommunications carrier to request additional telephone numbers. In one embodiment, the software is configured to notify a user that the current utilization of telephone numbers for a rate center is above 75 percent and the months to exhaust is below 6 months so that the user may act to request additional telephone numbers from the Pooling Administrator. The notification may be in the form of displaying the information in a different color (e.g., red) or other graphical indicator (e.g., flashing number). Still yet, a pop-up window or other alert may be used to notify the user of the current utilization and months to exhaust situation.

The following equations provided in the Months to Exhaust and Utilization Certification Worksheet may be used to compute months to exhaust and current utilization of a rate center. An exemplary Months to Exhaust and Utilization Certification Worksheet is shown in FIG. 10. As shown in FIG. 10, the MTE is 5.78 and Utilization is 75.87%, which enables the telecommunications carrier to request additional telephone numbers for the rate center, which, in this example, is Decatur.

Months to Exhaust=Numbers Available for Assignment to Customers/Average Monthly Forecast[1]

Utilization=(Assigned Numbers−Excluded Numbers[2])/(Total Numbering Resources−Excluded Numbers)

1 Average monthly forecast for the next 6 months
2 Quantity of numbers activated in the past 90 days and excluded from the Utilization calculation The following tables are examples of query results and computations based on query results that are used by the telecommunications carrier to determine months to exhaust and utilization. TABLE IX provides computations based on results from a query of one or more databases 214 managed by the service provider and the LERG database 220. A query of the database 214 may provide utilization information of a rate center and an average growth over a year may be generated. For example, Stevenson rate center has an average year growth of 279 subscribers for the carrier.

TABLE IX

Rate Center Average Annual Growth

| State | Rate Center | AvgYearGrowth |
|---|---|---|
| WA | Roosevelt | 7 |
| WA | Stevenson | 279 |
| WA | Sunnyside | 0 |
| WA | Toppenish | 78 |
| WA | Trout Lake | 7 |
| WA | Wapato | 0 |
| WA | WH Salmon | 433 |

A query of the LERG database 220 and/or service provider database 214 is able to provide a thousands block count as provided in TABLE X for each of the rate centers. As shown, the thousands blocks for a portion of the rate centers located in Florida are provided. For example, the rate center in Apopka, Fla. has 54 thousands blocks or 54,000 telephone numbers assigned to the carrier.

TABLE X

Rate Center Thousands Block Count

| State | Rate Center | Thousands Block Count |
|---|---|---|
| FL | Alford | 10 |
| FL | Apopka | 54 |
| FL | Arcadia | 30 |
| FL | Astor | 3 |
| FL | Avon Park | 29 |

A history query is used to report the amount of working phone numbers at the rate center level for each of the last 13 months. For example, if the current month is June 2006, month 13 (M13) is the previous month (i.e., May 2006). Month 1 (M1) is May 2005. By using a rolling 13 months of history, month 1 can be subtracted from month 13 to derive the past year of growth (positive) or loss (negative). The difference between M13 and M1 results in the previous year's growth, which can be projected forward to use for forecasted growth. TABLE XI is a table of an exemplary query of history from the past 13 months showing working telephone numbers within a rate center. The query results may be used to determine growth or loss of customers being serviced by the rate center for reporting to the Pooling Administrator.

TABLE XI

History Query

| State | Rate Center | NPA | YRMO | Working |
|---|---|---|---|---|
| TX | DECATUR | 940 | M13 | 22886 |
| TX | DECATUR | 940 | M12 | 22887 |
| TX | DECATUR | 940 | M11 | 22875 |
| TX | DECATUR | 940 | M10 | 22841 |
| TX | DECATUR | 940 | M9 | 21741 |
| TX | DECATUR | 940 | M8 | 21781 |
| TX | DECATUR | 940 | M7 | 21801 |
| TX | DECATUR | 940 | M6 | 21871 |
| TX | DECATUR | 940 | M5 | 21879 |
| TX | DECATUR | 940 | M4 | 22647 |
| TX | DECATUR | 940 | M3 | 22641 |
| TX | DECATUR | 940 | M2 | 22098 |
| TX | DECATUR | 940 | M1 | 21316 |

An ITYPE status query is used to report subtotals for combinations of Installed Type and Status at the NPA-NXX-X (thousands block) level. Results from such a status query is provided in TABLE XII. Installed types and statuses can be converted into NRUF categories in the same manner as NRUF reporting, with one of the categories being "assigned." Once all numbers are converted to the NRUF categories, the assigned numbers can be totaled at the rate center level. The thousands-blocks owned by a service provider can be counted at the rate center level from a service provider's inventory database. This number of blocks multiplied by 1000 numbers per thousands-block provides the total numbering resources for each of the company's rate centers. Subtracting the assigned numbers from the total numbering resources in each rate center provides the available numbers.

TABLE XII

ITYPE and Status Query

| NPA | NXX | THOU | ITYPE | STATUS | QTY |
|---|---|---|---|---|---|
| 219 | 261 | 0 | REG | WKG | 1 |
| 219 | 261 | 0 | SPL | WKG | 1 |
| 219 | 261 | 2 | COIN | ASN | 4 |
| 219 | 261 | 2 | COIN | VAC | 1 |
| 219 | 261 | 2 | COIN | VND | 23 |
| 219 | 261 | 2 | COIN | WKG | 72 |
| 219 | 261 | 2 | REG | DNA | 1 |
| 219 | 261 | 2 | REG | LNPO | 2 |
| 219 | 261 | 2 | REG | VAC | 1 |
| 219 | 261 | 2 | REG | VND | 153 |
| 219 | 261 | 2 | REG | WKG | 741 |
| 219 | 261 | 2 | REG | WLNP | 2 |

A number of queries may be performed from the LERG database 220. The LERG queries may provide information associated with pooling of telephone numbers from the telecommunications carrier that can be used for reporting to the Pooling Administrator. TABLE XIII is the result of an exemplary query from the LERG database 220 that includes a pooling indicator. The Telcordia Routing Administration website provides read-only access to view and download LERG data. It currently has a row limit for exports, so downloads may be split into one or more per state to avoid download problems.

TABLE XIII

Pooling Indicator LERG Query Results

| NPA | NXX | BLOCK_ID | EFF_DATE | OCN | RC_STATE | RC_NAME 10 | POOL_IND |
|-----|-----|----------|-------------|------|----------|------------|----------|
| 218 | 534 | A | 23 Sep. 2003 | 1456 | MN | Deerwood | N |
| 219 | 261 | A | 08 Jul. 2004 | 0832 | IN | Remington | Y |
| 219 | 261 | 0 | 19 Jul. 2004 | 0832 | IN | Remington | Y |
| 219 | 261 | 2 | 19 Jul. 2004 | 0832 | IN | Remington | Y |
| 219 | 261 | 3 | 19 Jul. 2004 | 0832 | IN | Remington | Y |
| 219 | 261 | 4 | 19 Jul. 2004 | 0832 | IN | Remington | Y |

Requesting Resources from the Pool

A request of resources from the telephone number pool when a telecommunications carrier already has resources from the pool in its inventory currently has the following guidelines (*PAS User Guide for SPs*, 5.2 Required Information Apr. 17, 2006, NeuStar, Inc.):

1) A listing of all codes and blocks in the telecommunications carrier's inventory for the pool related to a request
2) The quantity of available telephone numbers (TNs) in the telecommunications carrier's inventory for the pool
3) The total quantity of telephone numbers the telecommunications carrier has assigned for this pool
4) The quantity of telephone numbers the telecommunications carrier has assigned for this pool in each of the previous 6 months
5) The quantity of telephone numbers the telecommunications carrier expects to assign for this pool in each of the next 12 months The following definitions are provided by the Pooling Administrator for telecommunications carriers who participate in the pool (*PAS User Guide for SPs*, 5.4 Procedure Apr. 17, 2006, NeuStar, Inc.)

Available Numbers: the quantity of telephone numbers available in the telecommunications carrier's inventory for this pool.

Assigned Numbers: the quantity of telephone numbers in this pool the telecommunications carrier has assigned to customers.

Total Numbering Resources: the total quantity of telephone numbers assigned to the telecommunications carrier for this pool.

Quantity of Numbers Activated in the Past 90 Days and Excluded from Utilization Calculation: the quantity of telephone numbers that will be excluded from the utilization calculation because they are in codes/blocks activated in the past 90 days.

Growth History: the quantity of telephone numbers assigned to customers for each of the 6 previous months, with Month 6 being the current month.

Forecast: the quantity of telephone numbers your company expects to assign to customers in each of the next 12 months, with Month 1 being the current month.

NOTE: If the calculated month to exhaust value is greater than 6 and/or the calculated utilization percentage requirements are not met, the telecommunications carrier will not receive all of the blocks requested.

Figure 8A:
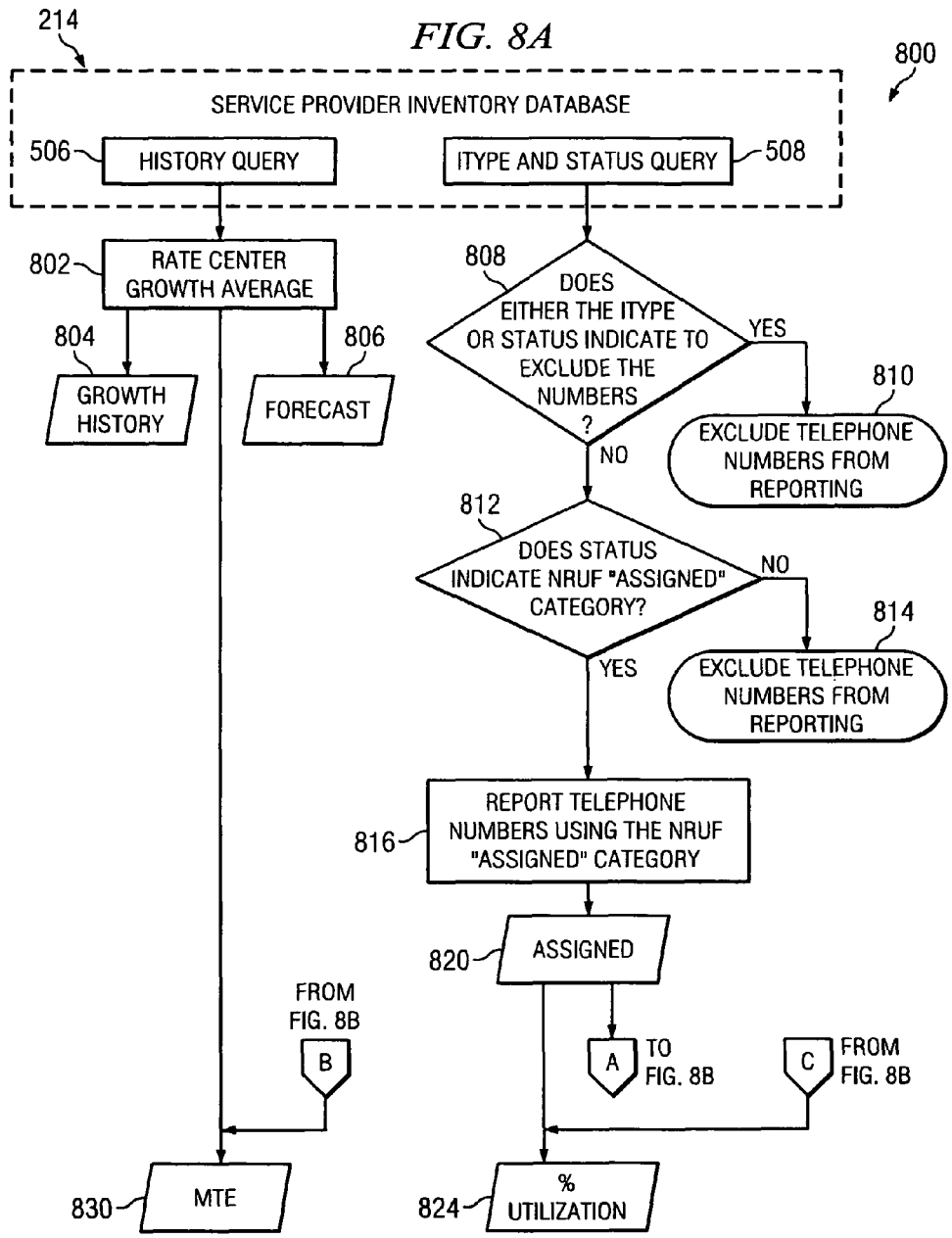
FIGS. 8A and 8B (collectively "FIG. 8") are flow diagrams of an exemplary process for determining and reporting months to exhaust to the Pooling Administrator for requesting additional thousands blocks of telephone numbers.
Figure 8B:
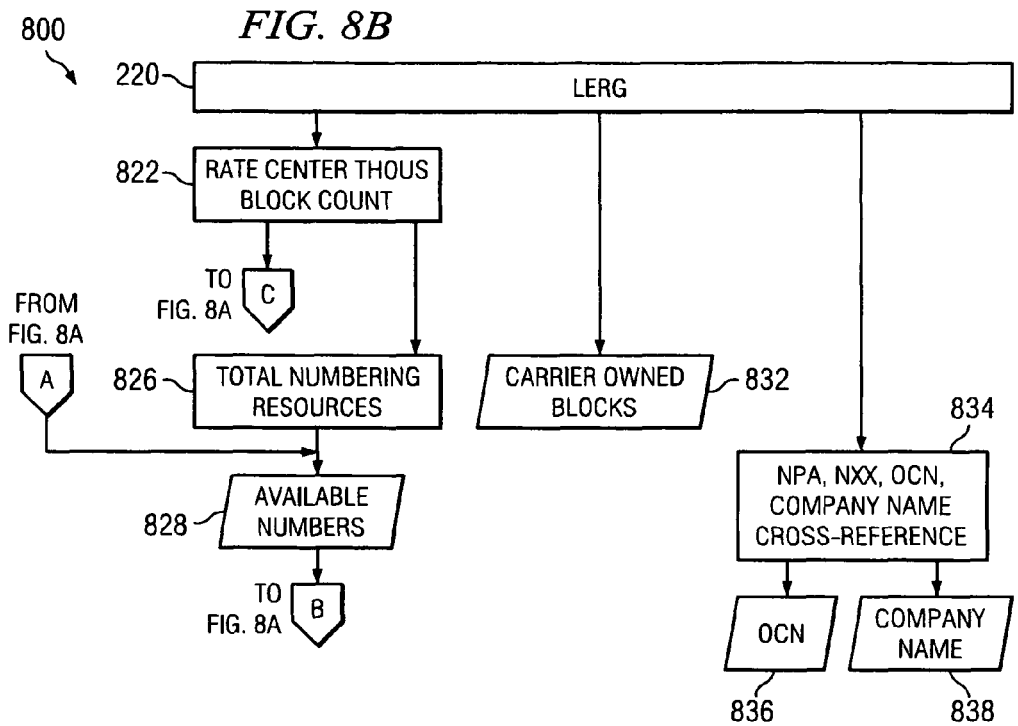

FIG. 8 is a flow diagram of an exemplary process 800 for determining and reporting months to exhaust to the Pooling Administrator for requesting additional thousands blocks of telephone numbers. The process 800 may be performed by a server operated by the telecommunications carrier and starts at step 802, where the results from a history query 506 from the service provider inventory database 214 is used to determine rate center growth average. At step 804, growth history is generated and reported in the Months to Exhaust and Utilization Spreadsheet (e.g., form 700a in FIG. 7A). At step 806, a forecast history is generated and reported in the Months to Exhaust and Utilization Spreadsheet.

An ITYPE & Status Query 508 is performed from the service provider inventory database 214. Based on the query 508, a determination is made as to whether either the ITYPE or status indicates to exclude the telephone numbers. If so, then the telephone numbers are excluded from reporting at step 810. Otherwise, at step 812, a determination is made as to whether status indicates an NRUF "assigned" category. If not, then the telephone numbers are excluded from reporting at step 814. Otherwise, if the thousands block of telephone numbers is assigned, then the telephone numbers are reported using the NRUF "assigned" category at step 816. At step 820, the telephone numbers (i.e., the thousands block of telephone numbers) are reported as being assigned on the Months to Exhaust and Utilization Spreadsheet.

At step 822, in response to a query of the LERG database 220, counts of thousands blocks assigned to each rate center are performed. A percent (%) utilization, which is reported on the Months to Exhaust and Utilization Spreadsheet, may be made at step 824 based on the assigned thousands blocks from step 820 and the thousands block count at step 822. At step 826, total numbering resources is determined for each rate center by multiplying the thousands block count determined at step 822 by 1000. The results of the determination are used along with the assigned thousands blocks from step 820 at step 828 to determine available numbers, where the available numbers are the total number of telephone numbers that are not assigned (i.e., total telephone number resources minus assigned telephone numbers). The available numbers are reported on the Months to Exhaust and Utilization Spreadsheet. At step 830, the months to exhaust is determined and reported.

At step 832, a determination is made as to the thousands blocks of telephone numbers owned by the telecommunications carrier. At step 834, NPA, NXX, OCN, company name cross-reference is performed from the LERG database 220. The NPA-NXX and OCN data are reported at steps 836 and 838, which are reported on the Months to Exhaust and Utilization Spreadsheet. It should be understood that the process 800 is exemplary and that other processes may be performed to produce the information for reporting to the Pooling Administrator via the Months to Exhaust and Utilization Spreadsheet.

Figure 9:
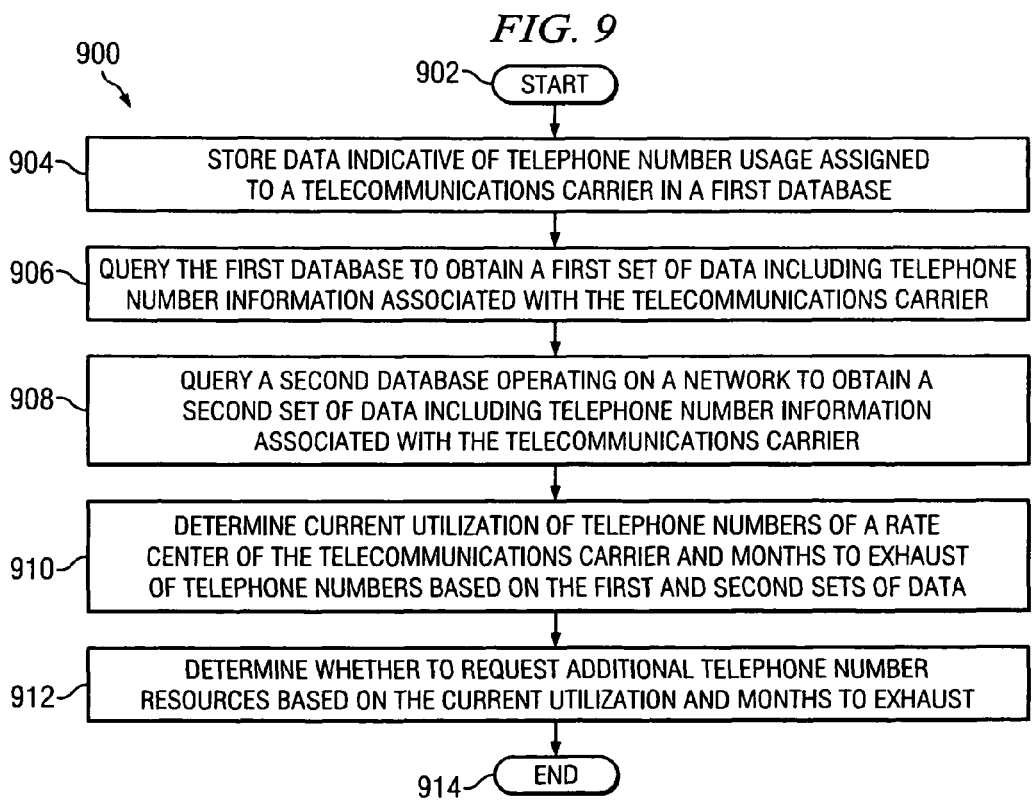
FIG. 9 is a flow diagram of an exemplary high-level process for requesting telephone number resources from a pooling administrator.

FIG. 9 is a flow diagram of an exemplary high-level process 900 for requesting telephone number resources from a pooling administrator. The process starts at step 902. At step 904, data indicative of telephone number usage assigned to a telecommunications carrier is stored in a first database. The first database is queried to obtain a first set of data including telephone number information associated with the telecommunications carrier at step 906. At step 908, a second database operating on a network, such as the Internet, is queried to obtain a second set of data including telephone number information associated with the telecommunications carrier. The second database may be the LERG database. At step 910, current utilization of telephone numbers of a rate center of the telecommunications carrier and months to exhaust of telephone numbers based on the first and second sets of data are determined. A determination as to whether to request additional telephone number resources based on the current utilization and months to exhaust is performed at step 912. The process 900 ends at step 914.

The process 900 may further include determining growth and current telephone number resources of the rate center. The growth may be based on historical growth at the rate center and per thousands blocks. The current utilization determination may include determining whether utilization is above 75 percent. Furthermore, the months to exhaust determination may be performed to determine whether the months to exhaust is at or below six months. If the current utilization is determined to be above 75 percent and months to exhaust is at or below six months, then a notification may be made to a user. The notification may be performed by a message in the same or different window (pop-up window), highlighting a number, or other technique as understood in the art. In determining current utilization, the determination may be made by determining the number of telephone numbers that are categorized. Still yet, a special customer request for a specified number of telephone numbers may be received and utilized in determining months to exhaust of telephone numbers. A report including months to exhaust and current utilization may be generated, where the report includes a Months to Exhaust and Utilization Spreadsheet.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for reporting phone numbers utilization to a telecommunications reporting agency, said system comprising:
    a first database operated by a telecommunications carrier and configured to store data indicative of telephone number usage of telephone numbers assigned to the telecommunications carrier;
    a computing device in communication with a second database via a network the second database containing telephone number usage information associated with multiple telecommunications carriers, said computing device executing software to query said first and the second databases to retrieve information associated with the telecommunications carrier (i) to determine current utilization of telephone numbers of a rate center and (ii) to determine months to exhaust of telephone numbers; and
    the computing device further configured to determine a form among a plurality of forms associated with the telecommunications reporting agency to include the determined current utilization of telephone numbers of the rate center and the determined months to exhaust of telephone numbers.

2. The system according to claim 1, wherein the software is further configured to determine growth and current telephone number resources of the rate center.

3. The system according to claim 1, wherein the second database is the local exchange routing guide (LERG) database.

4. The system according to claim 1, wherein the software is further configured to determine whether the current utilization of telephone numbers of the rate center is above 75 percent.

5. The system according to claim 4, wherein the software is further configured to determine whether the months to exhaust is at or below six months.

6. The system according to claim 5, wherein the software is further configured to notify a user that the current utilization of telephone numbers is above 75 percent and the months to exhaust is at or below six months.

7. The system according to claim 1, wherein the software, in determining current utilization of telephone numbers, determines utilization of the telephone numbers in each of the following categories: "assigned," "intermediate," "reserved," "aging," and "administrative."

8. The system according to claim 1, wherein the software is further configured to receive a special customer request for a specified number of telephone numbers, the special customer request being utilized by the software in determining months to exhaust of telephone numbers.

9. The system according to claim 8, wherein the software is further configured to generate a report including months to exhaust and current utilization.

10. The system according to claim 8, wherein the report is a Months to Exhaust and Utilization Spreadsheet.

11. A method for determining whether to request additional telephone number resources for a telecommunications carrier, said method comprising:
    storing data indicative of telephone number usage assigned to a telecommunications carrier in a first database;
    querying the first database to obtain a first set of data including telephone number information associated with the telecommunications carrier;
    querying a second database operating on a network to obtain a second set of data including telephone number information associated with the telecommunications carrier;
    determining current utilization of telephone numbers of a rate center of the telecommunications carrier and months to exhaust of telephone numbers based on the first and second sets of data, wherein determining the current utilization of telephone numbers of the rate center includes determining an installed type and status at the NPA-NXX-X (thousands block) level; and
    determining whether to request additional telephone number resources based on the current utilization and months to exhaust.

12. The method according to claim 11, further comprising determining growth and current telephone number resources of the rate center.

13. The method according to claim 11, wherein querying the second database includes querying the local exchange routing guide (LERG) database.

14. The method according to claim 11, further comprising determining whether current utilization of telephone numbers of the rate center is above 75 percent.

15. The method according to claim 14, further comprising determining whether months to exhaust is at or below six months.

16. The method according to claim 15, further comprising notifying a user that the current utilization of telephone numbers is above 75 percent and the months to exhaust is at or below six months.

17. The method according to claim 11, wherein determining current utilization includes determining utilization of the telephone numbers in each of the following categories: "assigned," "intermediate," "reserved," "aging," and "administrative."

18. The method according to claim 11, further comprising receiving a special customer request for a specified number of telephone numbers, the special customer request being utilized by the software in determining months to exhaust of telephone numbers.

19. The method according to claim 18, further comprising generating a report including months to exhaust and current utilization.

20. The method according to claim 19, wherein generating a report includes generating a Months to Exhaust and Utilization Spreadsheet.

* * * * *